(12) United States Patent
Nichols et al.

(10) Patent No.: US 12,509,027 B2
(45) Date of Patent: Dec. 30, 2025

(54) METHODS AND APPARATUSES FOR CAR WASH USER EXPERIENCE

(71) Applicant: Quick Quack Car Wash Holdings, LLC, Roseville, CA (US)

(72) Inventors: Joseph Matthew Nichols, Rocklin, CA (US); Christopher Clinton Chappell, Lincoln, CA (US); Mcnamara Marlow Pope, III, Fair Oaks, CA (US); Rodney Daniel Sparks, Antelope, CA (US); Joseph Allen Steele, III, Plumas Lake, CA (US); Josh David Schumacher, Sacramento, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/196,147

(22) Filed: May 11, 2023

(65) Prior Publication Data
US 2024/0375618 A1    Nov. 14, 2024

(51) Int. Cl.
*B60S 3/04*   (2006.01)
*G07C 5/00*   (2006.01)

(52) U.S. Cl.
CPC ............. *B60S 3/04* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 6,277,207 B1 * | 8/2001 | Gauthier | B60S 3/042 134/123 |
| 10,112,585 B1 * | 10/2018 | Tokatyan | B60S 5/00 |
| 10,360,647 B2 | 7/2019 | Pallas | |
| 2004/0220817 A1 * | 11/2004 | Sanville | B60S 3/00 700/265 |
| 2005/0229808 A1 * | 10/2005 | MacDowell | B60S 3/004 105/157.1 |
| 2006/0180647 A1 * | 8/2006 | Hansen | G07F 17/20 235/375 |
| 2008/0040882 A1 * | 2/2008 | Duterme | B60S 3/002 15/319 |
| 2008/0229531 A1 * | 9/2008 | Takida | B60S 3/042 15/53.4 |
| 2009/0057401 A1 * | 3/2009 | Brott | G06Q 20/28 235/382 |

(Continued)

FOREIGN PATENT DOCUMENTS

| | | | |
|---|---|---|---|
| CN | 105564388 A | * | 5/2016 |
| CN | 109131247 A | * | 1/2019 |

(Continued)

*Primary Examiner* — Omair Chaudhri
(74) *Attorney, Agent, or Firm* — Caldwell Intellectual Property Law

(57) ABSTRACT

An apparatus and method for user car wash preferences is disclosed. The apparatus includes a processor and memory. The processor is configured to receive vehicle and user data for use during a car wash. The processor further receives sensor data and adjusts an operational parameter of a car wash component based on the user data and sensor data. The processor further alters an operational state of the car wash component based on the user data, the sensor data, and the adjustment to the operational parameter.

20 Claims, 8 Drawing Sheets

(56) References Cited

U.S. PATENT DOCUMENTS

| | | | | |
|---|---|---|---|---|
| 2011/0126857 | A1* | 6/2011 | Kaipainen | B60S 3/04 134/57 R |
| 2012/0253973 | A1* | 10/2012 | Harter | G06Q 20/3224 455/456.3 |
| 2013/0224721 | A1* | 8/2013 | Gilling | G09B 19/16 434/373 |
| 2013/0239992 | A1* | 9/2013 | Detrick | B60S 3/04 92/5 R |
| 2014/0261578 | A1* | 9/2014 | Belanger | B01F 25/4523 137/15.01 |
| 2016/0059831 | A1* | 3/2016 | Belanger | B60S 3/04 134/56 R |
| 2016/0063591 | A1* | 3/2016 | Belanger | B08B 1/002 705/26.61 |
| 2017/0151934 | A1* | 6/2017 | Almalki | B08B 1/008 |
| 2017/0186247 | A1* | 6/2017 | Thorley | G07C 5/006 |
| 2017/0203736 | A1* | 7/2017 | Belanger | B60S 3/04 |
| 2018/0018649 | A1* | 1/2018 | Aminoff | G07F 17/20 |
| 2018/0341270 | A1* | 11/2018 | Dudar | G06Q 50/40 |
| 2018/0345918 | A1* | 12/2018 | Foerg | G07F 17/20 |
| 2019/0295135 | A1* | 9/2019 | Jones | G06Q 30/0281 |
| 2020/0108801 | A1* | 4/2020 | Frederick | B60S 1/481 |
| 2020/0142363 | A1* | 5/2020 | Ray | G05B 13/0285 |
| 2020/0189532 | A1* | 6/2020 | Kim | B60S 3/06 |
| 2020/0191176 | A1* | 6/2020 | Kerpan | F15B 21/14 |
| 2020/0215584 | A1* | 7/2020 | Wells, II | B08B 1/32 |
| 2020/0226584 | A1* | 7/2020 | Nawoj | G07F 17/20 |
| 2020/0282958 | A1* | 9/2020 | Stephenson | G06V 20/00 |
| 2021/0024040 | A1* | 1/2021 | Steininger | G06T 7/60 |
| 2021/0197859 | A1* | 7/2021 | Canady | G05D 1/0231 |
| 2021/0224976 | A1* | 7/2021 | Yonezawa | G06T 7/0008 |
| 2021/0261098 | A1* | 8/2021 | Kircheis | B60S 3/06 |
| 2021/0278543 | A1* | 9/2021 | Simon | F16M 11/10 |
| 2022/0055526 | A1* | 2/2022 | Uvarov | B60Q 1/0023 |
| 2022/0250590 | A1* | 8/2022 | Gimeno Ferrer | G07C 5/0808 |
| 2023/0004899 | A1* | 1/2023 | Van Breen | B60S 3/04 |
| 2023/0156439 | A1* | 5/2023 | Mayer | H04W 4/38 134/18 |
| 2023/0249653 | A1* | 8/2023 | Stoel | B60S 3/04 705/1.1 |
| 2023/0256943 | A1* | 8/2023 | Malki | B60S 3/004 700/225 |

FOREIGN PATENT DOCUMENTS

| | | | | |
|---|---|---|---|---|
| CN | 109591769 | A | * 4/2019 | |
| CN | 115392514 | A | 11/2022 | |
| DE | 20114359 | U1 | * 1/2002 | B60S 3/063 |
| KR | 20200126175 | A | * 11/2020 | |
| KR | 102488822 | B1 | * 1/2023 | |
| WO | WO-2018007846 | A1 | * 1/2018 | |
| WO | WO-2024017462 | A1 | * 1/2024 | |

* cited by examiner the drawings.

METHODS AND APPARATUSES FOR CAR WASH USER EXPERIENCE

FIELD OF THE INVENTION

The present invention generally relates to the field of vehicle car washes. In particular, the present invention is directed to methods and apparatuses for improving a user experience in a car wash.

BACKGROUND

Car washes are frequently unexciting for users having their cars cleaned. Presently existing solutions focus on the cleaning of the car, and not the excitement of the user. A solution is needed to improve the experience of the user having their car cleaned and thereby increase the likelihood that a user returns to the car wash repeatedly.

SUMMARY OF THE DISCLOSURE

In an aspect an apparatus for car wash customization is disclosed. The apparatus comprises a processor communicatively connected to a memory and configured to receive user data, the user data containing information related to at least one of a vehicle and a car wash preference, receive sensor data related to the vehicle, adjust an operational parameter of a car wash component based on the user data and the sensor data, and alter an operational state of the car wash component based on the user data, the sensor data, and the adjustment to the operational parameter.

In an aspect a method for car wash customization is disclosed. The method comprises the steps of receiving, by a processor, user data, the user data containing information related to at least one of a vehicle and a car wash preference; receiving, by the processor, sensor data related to the vehicle; adjusting, by the processor, an operational parameter of a car wash component based on the user data and the sensor data; and altering, by the processor, an operational state of the car wash component based on the user data, the sensor data, and the adjustment to the operational parameter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, car washes are frequently unexciting for users having their cars cleaned. Presently existing solutions focus on the cleaning of the car, and not the excitement of the user. A solution is needed to improve the experience of the user having their car cleaned and thereby increase the likelihood that a user returns to the car wash repeatedly. This can have the benefit of generating additional business for the car wash, gaining attention for the car wash on social media, and improving customer satisfaction.

Figure 1:
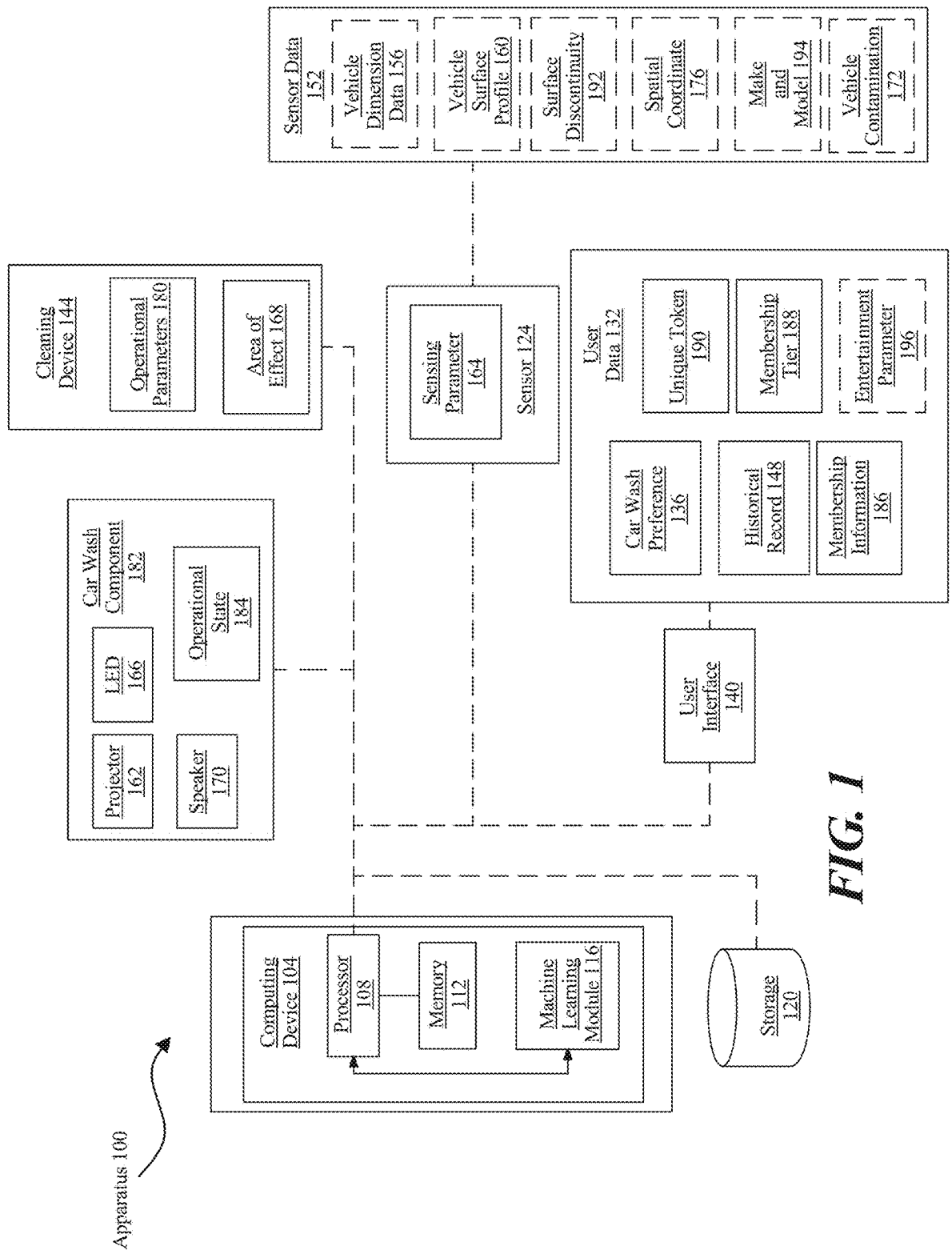
FIG. 1 illustrates an apparatus for improving a user experience in a car wash.

Referring now to FIG. 1, an apparatus 100 for dimensioning a vehicle in a car wash is described. The apparatus 100 includes at least one computing device 104. The computing device 104 includes a processor 108 communicatively connected to a memory 112. Computing device 104 may include a machine learning module 116 and be communicatively connected to a storage 120. Apparatus 100 includes at least one sensor 124. As used in this disclosure, a "sensor" is a device that is configured to detect a phenomenon and transmit information related to the detection of the phenomenon. For example, and without limitation, a sensor may transduce a detected phenomenon and/or characteristic, such as, and without limitation, temperature, voltage, current, pressure, and the like, into a sensed signal such as a voltage with respect to a reference. Sensor 124 may detect a plurality of data. A plurality of data detected by sensor 124 may include, but is not limited to battery capacity, current, voltage, pressure, temperature, moisture level, and the like. In one or more embodiments, and without limitation, sensor 124 may include a plurality of sensors. In one or more embodiments, and without limitation, sensor 124 may include an optical or image sensor such as a camera, a CMOS detector, a CCD detector, a video camera, a photodiode, a photovoltaic cell, a photoconductive device, a thermal and/or infrared camera, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 124 may be a contact or a non-contact sensor. Signals may include electrical, electromagnetic, visual, audio, radio waves, or another undisclosed signal type alone or in combination. At least one sensor 124 may include a weight sensor, such as a sensor configured to detect the presence of a vehicle by detecting at least part of the weight of the vehicle.

With continued reference to FIG. 1, at least one sensor 124 may include a humidity sensor. Humidity, as used in this disclosure, is the property of a gaseous medium to hold water in the form of vapor. For example, apparatus 100 may include a humidity sensor to detect how thoroughly a vehicle has been dried in a drying section of a car wash after the vehicle has been cleaned.

With continued reference to FIG. 1, at least one sensor 124 may include a multimeter. A multimeter may be configured to measure voltage across a component, electrical current through a component, and resistance of a component. A multimeter may include separate sensors to measure each of the previously disclosed electrical characteristics such as voltmeter, ammeter, and ohmmeter, respectively.

With continued reference to FIG. 1, sensor 124 may include electrical sensors. Electrical sensors may be configured to measure voltage across a component, electrical current through a component, and resistance of a component. In one or more embodiments, sensor 124 may include thermocouples, thermistors, thermometers, infrared sensors, resistance temperature detectors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 124, may be measured in Fahrenheit (° F.), Celsius (° C.), kelvin (K), Rankine (° R), or another scale alone or in combination. The temperature measured by sensors may comprise electrical signals, which are transmitted to their appropriate destination wireless or through a wired connection.

With continued reference to FIG. 1, at least one sensor 124 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include translation, spinning, rotation, oscillation, gyration, sliding, reciprocation, or the like. A motion sensor may include a torque sensor, gyroscope, accelerometer, magnetometer, inertial measurement unit (IMU), pressure sensor, force sensor, proximity sensor, displacement sensor, vibration sensor, among others.

With continued reference to FIG. 1, sensor 124 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like. Sensor 124 may be configured to detect a plurality of data, as discussed further below in this disclosure. A plurality of data may be detected from sensor 124.

With continued reference to FIG. 1, sensor 124 may include a sensor suite which may include a plurality of sensors that may detect similar or unique phenomena. For example, in a non-limiting embodiment, a sensor suite may include a plurality of voltmeters or a mixture of voltmeters and thermocouples. Apparatus 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 1, sensor 124 may include a sense board. A sense board may have at least a portion of a circuit board that includes one or more sensors configured to measure or detect a sensor input. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, in some embodiments, at least a sensor 124 may include at least a camera. In some embodiments, an apparatus 100 may include a plurality of cameras. As used in this disclosure, a "camera" is a device that is configured to sense electromagnetic radiation, such as without limitation visible light, and generate an image representing the electromagnetic radiation. In some cases, the at least a camera may include one or more optics. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared. In some embodiments, the at least a camera may generate image data, where sensor data 128 may include the image data as described below. As used in this disclosure, "image" is information representing at least a physical scene, space, and/or object. As a non-limiting example, the image data may include an image of a vehicle, a license plate, door, window, handle, and the like of the vehicle, a driver of the vehicle, and the like. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 1, in some embodiments, sensor 124 may perform license plate identification as disclosed in U.S. Nonprovisional application Ser. No. 18/195,537, filed on May 10, 2023, and entitled "APPARATUS AND METHOD FOR AUTOMATIC LICENSE PLATE RECOGNITION OF A VEHICLE" and U.S. Nonprovisional application Ser. No. 18/195,597, filed on May 10, 2023, and entitled "AN APPARATUS AND METHOD FOR GENERATING A VEHICLE MAINTENANCE ACTIVITY," the entirety of each of which are incorporated herein by reference.

With continued reference to FIG. 1, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection, track eyes; detection persons, for example by way of a trained machine learning model; detect camera motion, detect and decode barcodes; capture images; and record video.

With continued reference to FIG. 1, in some embodiments, a camera may include a plurality of cameras, wherein the plurality of cameras may capture two or more perspectives for use in three-dimensional (3D) reconstruction. The camera may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL, may operate at depth ranges of about 50 cm to about 300 cm. Persons skilled in the art, upon reviewing the entirety of this disclosure, will be aware of various types of cameras that may be used for the disclosure.

With continued reference to FIG. 1, in some embodiments, at least a sensor 124 may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some embodiments, the at least a photodetector may be implemented in the LiDAR system as described below. As a non-limiting example, the at least a photodetector may receive laser light from a light detecting and ranging (LiDAR) system that reflects off an object, such as but not limited to a vehicle, or environment and may convert it into an electrical signal, such as but not limited to LiDAR data of sensor data 128. The LiDAR data and the sensor data 128 disclosed herein are further described in detail below. In some cases, at least a photodetector may be communicative with a computing device such as but not limited to at least a processor 108, such that the sensed signal such as but not limited to the LiDAR data of the sensor data 128 may be communicated with the at least a processor 108. In some embodiments, the electrical signal from the at least a photodetector may be stored in a storage 120. The storage 120 disclosed herein is further described below.

With continued reference to FIG. 1, in some cases, at least a photodetector may include a photodiode, a photoresistor, a photosensor, a photovoltaic chip, and the like. In some cases, the at least a photodetector may include a Germanium-based photodiode. The at least a photodetector may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. "Avalanche Photo Diodes (APDs)," as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When the reverse bias is less than the breakdown voltage, the gain of the APD may be approximately linear. For silicon APDs, this gain may be on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage may be referred to as a Single Photon Avalanche Diode, or SPAD. In this case, the n-p electric field may be sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode.

With continued reference to FIG. 1, in some embodiments, at least a photodetector may include a charge-coupled device (CCD), a complementary metal-oxide-semiconductor (CMOS) sensor, and the like. As a non-limiting example, the CCD sensor may include an array of tiny pixels that are sensitive to light. As another non-limiting example, the CMOS sensor may include an array of photodiodes. In both CCD and CMOS sensors, the electrical charge generated by the photodetector may be converted into a voltage signal, which may be then amplified and converted into a digital signal by a camera's analog-to-digital converter (ADC). The digital signal may be then processed by the camera's electronics to create an image.

With continued reference to FIG. 1, in some embodiments, at least a photodetector of at least a sensor 124 may be implemented in a light detection and ranging (LiDAR) system. In some embodiments, an apparatus 100 may include the LiDAR system. For the purposes of this disclosure, a "light detection and ranging system" is a system for determining ranges by targeting an object or a surface with a laser and measuring the time for the reflected light to return to a receiver. As a non-limiting example, the LiDAR system may include a range-imaging camera, wherein the range-imaging camera that may be included in at least a sensor 124, that may include Intel® RealSense™ D430 Module, from Intel® of Mountainview, California, U.S.A. The D430 Module may include active infrared (IR) illumination and a stereoscopic camera, having global shutters and frame rate of up to 90 fps. The D430 Module may provide a field of view (FOV) of 85.2° (horizontal) by 58° (vertical) and an image resolution of 1280×720. In some embodiments, the range-sensing camera may be operated independently by dedicated hardware or, in some cases, range-sensing camera may be operated by a computing device. In some cases, the range-sensing camera may include software and firmware resources (for execution on hardware, such as without limitation dedicated hardware or a computing device). The D430 Module may be operated using software resources including but not limited to Intel® RealSense™ SDK 2.0, which may include opensource cross platform libraries.

With continued reference to FIG. 1, in some embodiments, a LIDAR system may include an optical source. For the purposes of this disclosure, an "optical source" is any device configured to emit electromagnetic radiation. As a non-limiting example, the electromagnetic radiation (also referred as light, laser, laser light, and the like) may include ultraviolet (UV), visible light, infrared light, and the like. In some embodiments, the LiDAR system may emit the electromagnetic radiation to an object such as but not limited to a vehicle using the optical source. In some cases, the optical source may include a non-coherent optical source configured to emit non-coherent light, for example a light emitting diode (LED). In some cases, the optical source may emit a light having substantially one wavelength. In some cases, the optical source may emit the light having a wavelength range. The light may have a wavelength in an ultraviolet range, a visible range, a near-infrared range, a mid-infrared range, and/or a far-infrared range. For example, in some cases the light may have a wavelength within a range from about 100 nm to about 20 micrometers. For another example, in some cases the light may have the wavelength within a range from about 500 nm to about 1550 nm. The optical source may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. The optical source may additionally or alternatively include a light-emitting diode (LED), an organic LED (OLED) and/or any other light emitter.

With continued reference to FIG. 1, in some embodiments, a LiDAR system may include optics. For the purposes of this disclosure, an "optic" is a device that focus and direct electromagnetic radiation to a target area. As a non-limiting example, the optics may include lenses, mirrors, filters, and the like. In some embodiments, the LiDAR system may include a scanner. For the purposes of this disclosure, a "scanner" is a rotating mirror or prism that directs laser in different directions. In some embodiments, the scanner may scan the laser in a horizontal, vertical pattern and wide arrange of angles to create a 3D point cloud of an object such as but not limited to a vehicle or environment.

With continued reference to FIG. 1, in some embodiments, a LiDAR system may include timing electronics. For the purposes of this disclosure, a "timing electronic" is a device that is configured to control the timing and synchronization of an optical source, scanner, and photodetector. In an embodiment, the timing electronics may be configured to ensure that a laser pulse is emitted at the correct time and that the photodetector receives the reflected light at the appropriate time. In another embodiment, the timing electronics may be configured to coordinate the movement of the scanner to ensure that the laser pulse is directed towards a target area and that the reflected light is detected from the correct angle. In some embodiments, the timing electronics may include a timing circuit, which may generate precise pulses at a specific frequency. When the reflected light returns to the LiDAR system, it may be detected by the at least a photodetector. In some embodiments, the timing electronics may be configured to measure time-of-flight of the laser pulse. For the purposes of this disclosure, "time-of-flight" is the time it takes for a pulse of light to travel to a target area and back to a LIDAR system. In some embodiments, based on the time-of-flight measurement and the speed of light, the distance to the target, such as but not limited to a vehicle, can be calculated. In some embodiments, the timing electronics may be communicative with at least a processor 108. As a non-limiting example, the at least a processor may process data from the at least a photodetector and the timing electronics, such as but not limited to LIDAR data of sensor data 128 to create a model of the vehicle. In some embodiments, the timing electronics may be communicative with a storage 120, where the storage 120 is described below. As a non-limiting example, the storage 120 may include the data from the at least a photodetector and the timing electronics. As another non-limiting example, the at least a processor 108 may retrieve the LiDAR data from the storage 120. With continued reference to FIG. 1, sensor 124 is configured to transmit a sensor output signal representative of sensed information. As used in this disclosure, a "sensor signal" is a representation of a sensed information that sensor 124 may generate. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, processor 108 is configured to receive user data 132, the user data 132 containing information related to at least one of a vehicle and a car wash preference 136. "User data," as used herein, is defined as information pertaining to a user. In an embodiment, user data 132 may include user identifying information (such as name, age, job, address, etc.), information relating a user to a vehicle (such as vehicles owned by a user, a vehicle identification number (VIN) of a vehicle belonging to or driven by a user, dimensions of a vehicle, vehicle title, vehicle insurance information, vehicle loan information, and the like), payment information (such as a credit card number, a debit card number, a checking account number, etc.), a car wash preference 136 (e.g. a lighting preference such as light show or other light display while a user vehicle is traveling through a car wash, a scent, a welcome screen or other presentation provided by a user interface 140, a cleaning device 144 to be used, a focus area for the car wash, an area of a vehicle to be ignored, a wash characteristic such as a brush RPM, a water temperature, an inclusion of soap or wax, an inclusion of a premium service such as detailing or a premium soap, extra cleaning for the tires, etc.). User data 132 may include a historical record 148 of the car wash preference 136. A "historical record," as used herein, is defined as a record of past events or selections. A historical record 148 may include a previous user car wash preference 136, car wash preferences 136 that a user selected for different vehicles, a change in the car wash preference 136 over time, previous license plates associated with a user, and the like. User data 132 may include information received from a user such as a vehicle driver or passenger. User data 132 may be received through user interface 140, for instance from a smartphone, vehicle interface, tablet, laptop, or any suitable computing device in accordance with the disclosure. User interface 140 may be part of a device controlled by a user such as a smartphone, a tablet, a vehicle display or interface, laptop computer, and the like. In an exemplary embodiment, user data 132 is received from a user interface 140 controlled by a child in a back seat of a vehicle to change the lights, sounds, music, sound effects, cleaning device 144 movement patterns, commands for car wash components, and the like. A "command," as used herein, is defined as an instruction directed toward an operation of a component. Examples of commands for car wash components included in user data 132 include commands altering or affecting operational parameters 180, areas of effect 168, car wash component operational state 184, area of effect 168 patterns (e.g. user data 132 may include a command for a suds sprayer to spray soap suds on the windshield of a vehicle in the shape of a smiley face), and the like. In an additional or alternative example, a user interface 140 may include a touchscreen interface where a user may draw a movement pattern or select predetermined movement pattern options from a user interface 140 that specify a successive sequence of positions for a car wash component 182 or cleaning device 144 to occupy successively over a predetermined period of time. For example, a user interface 140 may present an option for a user to select a number of brushes to be activated and a movement pattern such that the brushes move relative to one another to create a visual effect from the perspective of a driver or passenger in a vehicle being cleaned such as a series of brushes creating a sinusoidal wave pattern.

With continued reference to FIG. 1, processor 108 receives sensor data 152 related to a vehicle. In an embodiment, sensor data 152 is received from a sensor 124. "Sensor data related to a vehicle," as defined herein, is one or more elements of information related to a vehicle detected by a sensor. For example, sensor data 152 may include a vehicle position, a vehicle dimension, a presence or location of an object in contact with a vehicle such as foam, any information detected by a sensor 124 including information related to a space in which a vehicle is present, an element of a car wash such as a physically present element, and the like. Sensor data 152 may include sensor data from the sensor 124. For example, sensor data may include image data from a camera (e.g. one or more images of a vehicle), LiDAR point cloud data from a LIDAR sensor (e.g. a point cloud representing a vehicle surface profile), radar data from a radar sensor (e.g. radar return data from a surface of a vehicle), or any data related to a vehicle that a sensor in accordance with this disclosure may be capable of recording, receiving, or detecting. Sensor data 152 may additionally include information related to a vehicle such as make and model, vehicle identification number (VIN), license plate, personal information regarding a vehicle user or owner (such as name, address, loan or ownership status, insurance information, car wash preference(s), payment information such as credit card, bank account, customer loyalty program, and the like), and the like.

With continued reference to FIG. 1, processor 108 is further configured to determine vehicle dimension data 156 including a vehicle surface profile 160 from the sensor data 152. A "vehicle surface profile," as used herein, is defined as a two- or three-dimensional representation of a vehicle surface. In an embodiment, sensor data may include vehicle dimension data. "Vehicle dimension data," as used herein, is defined as one or more elements of information related to a dimension of a vehicle. For example, vehicle dimension data may include a maximum length (such as the largest possible distance from one element of the vehicle to another element of the vehicle when measuring a straight line parallel to both the ground plane on which the vehicle rests and a principal direction of travel of the vehicle), a maximum width (such as the largest possible distance from one element of the vehicle to another element of the vehicle when measuring a straight line parallel to the ground plane on which the vehicle rests and perpendicular to a principal direction of travel of the vehicle), a maximum height of the vehicle (such as the largest orthogonal distance from a ground plane on which the vehicle rests to a physical element of the vehicle), a maximum length, width, or height of a component of the vehicle, a coordinate of an element of the vehicle such as a point on an outer surface of the vehicle, a location of an element of the vehicle in relation to another point or element or component of the vehicle, a location of an element of the vehicle in relation to a reference point separate from the vehicle, a location of an element of the vehicle that does not correspond to a model or design dimension of a vehicle (e.g. a location of vehicle damage such as a dent, scratch, or the like), a plurality of points defining a surface of a vehicle (for example three dimensional representation of LiDAR or laser rangefinder data such as a point cloud), and the like. "A principal direction of travel of the vehicle," as used herein, is defined as a direction that that the vehicle is designed to travel while moving in a straight line. In an additional or alternative embodiment, processor 108 may determine vehicle dimension data 156 by calculating, analyzing, transforming, or extracting elements of sensor data 152. Processor 108 may compare sensor data 128 with a calibration measurement, for example time of flight data indicating that a sensor reading of 0.00003 s corresponds to a point 3.5 feet away from the sensor. Processor 108 may then take multiple readings of a vehicle, for example multiple readings with a single sensor or multiple readings with a plurality of sensors. Processor 108 may be configured by instructions contained on memory 112 to calibrate the location of the one or more sensors 124, e.g. by assigning at least one spatial coordinate to the sensor location. Processor 108 may then determine the location of one or more objects detected in sensor data 128 such as a vehicle by determining the distance and angle from the sensor 124 to the object in a coordinate system such as a cartesian, cylindrical, or spherical coordinate system and may measure the distance between points to determine one or more dimensions of a vehicle.

With continued reference to FIG. 1, vehicle dimension data 156 and/or vehicle surface profile 160 may include a point cloud. A "point cloud," as used herein, is defined as a set of points in a three dimensional space. For example, a three-dimensional physical space may be represented as a three-dimensional matrix with a predetermined number of points, for example 1,000,000 elements in a 100×100×100 matrix with entries of 0 indicating no object occupies a particular index and an entry of 1 indicates an object occupies a particular index. A point cloud may be the indices of the matrix where an object interrupted a LIDAR detection signal and are marked in the matrix as a 1. Processor 108 may receive vehicle dimension data 156 in the form of a point cloud or may construct a point cloud by receiving repeated sampling data from sensor 124. Processor 108 may be configured by instructions contained on memory 112 to cause sensor 124 to sample a predetermined three-dimensional volume to determine vehicle dimension data 156 and/or a vehicle surface profile 160 based on an indication received by an additional sensor. For example, a pressure sensor located in the floor of a car wash may detect the presence of a vehicle when the vehicle rolls over the pressure sensor. Upon receiving a signal from the pressure sensor, processor 108 may be configured by instructions contained on memory 112 to cause one or more LiDAR sensors to sample a predetermined volume to determine a surface profile and dimensions of a vehicle entering a car wash. In some embodiments, the lidar data of the sensor data 152 may be received from at least a photodetector and timing electronics of the LiDAR system. In an embodiment, the lidar data of the sensor data 152 may include distance data. For the purposes of this disclosure, "distance data" is a distance light traveled to a surface of an object. In some embodiments, the distance data may include time-of flight (ToF). In some embodiments, the distance may be calculated using time it takes for the light to travel to the object and back, the ToF. As a non-limiting example, at least a processor 108 may calculate the distance using the following equation: d=c+t/2, where c is the speed of light, d is the distance between the detector and the object or surface being detected, and t is the time spent for the light to travel to the object or surface being detected, then travel back to the detector (the ToF). In another embodiment, the lidar data of the sensor data 152 may include point cloud data.

With continued reference to FIG. 1, processor 108 may generate a plurality of registrations matching each frame of a plurality of frames of visual input data to a field coordinate system. A "field coordinate system," as used herein is a coordinate system of the field of view, such as a Cartesian coordinate system a polar coordinate system, or the like; field coordinate system does not depend on a location of sensor 124. In other words, a position of an object within the field coordinate system is static unless the object is moved. Field coordinate system may include a three-dimensional coordinate system. An origin point of field coordinate system may be selected, without limitation, for convenience of calculation, such as selection of a pixel on a frame, such as a first frame as described below which may include without limitation an origin point on a coordinate system of first frame.

With continued reference to FIG. 1, generating plurality of registrations includes defining a first registration of a first frame to the field coordinate system. "Registration" of a frame to a coordinate system, as used in this disclosure, means identifying a location within the coordinate system of each pixel of the frame, either by directly identifying the location of each pixel, and/or by identifying a location of a sufficient number of pixels, such as corner pixels or the like, of the frame to make mathematical determination of location of all other pixels mathematically possible; registration may include identifying coordinates of some excess number of pixels to the minimal number needed to identifying position within the coordinate system, such as identification of one pixel more, twice as many pixels, or ten times as many pixels, where excess pixels may be used to perform error detection and/or correction as described in further detail below. Registration of a frame to field coordinate system may be characterized as a map associating each pixel of a frame, and/or coordinates thereof in a frame coordinate system, to a pixel of field coordinate system. Such mapping may result in a two-dimensional projection of corresponding three-dimensional coordinates on one or more two-dimensional images. First frame may be selected upon initial detection of a vehicle, upon commencement of a predetermined process, based on instructions received from memory 112, and/or that an object of interest is in frame of a sensor 124 such as an image sensor; first frame may be selected as a frame generated when such command is received. First frame may include two frames where two frames are captured for stereoscopic images; in this case each such frame may be separately registered, and corresponding subsequent frames may be registered with regard to corresponding original first frame. In the description that follows, it should be assumed that each process described may be performed in parallel on two families or streams of frames forming a stereoscopic image.

With continued reference to FIG. 1, processor 108 may use an image recognition algorithm. In an embodiment, an image recognition algorithm may include an edge-detection algorithm, which may detect one or more shapes defined by edges. An "edge detection algorithm," as used in this disclosure, includes a mathematical method that identifies points in a digital image at which the image brightness changes sharply and/or has discontinuities. In an embodiment, such points may be organized into straight and/or curved line segments, which may be referred to as "edges." Edge detection may be performed using any suitable edge detection algorithm, including without limitation Canny edge detection, Sobel operator edge detection, Prewitt operator edge detection, Laplacian operator edge detection, and/or Differential edge detection. Edge detection may include phase congruency-based edge detection, which finds all locations of an image where all sinusoids in the frequency domain, for instance as generated using a Fourier decomposition, may have matching phases which may indicate a location of an edge.

Alternatively, or additionally, and with continued reference to FIG. 1, identifying a detected shape may include classifying the detected shape to a label using an image classifier. An image classifier may be trained using a plurality of images, such as images of a physical space In an embodiment, an image classifier may be configured to determine which of a plurality of edge-detected shapes is closest to a known feature of a physical space as determined using training data.

With continued reference to FIG. 1, processor 108 may select a first frame from a plurality of potential frames, on which to pause, based on image quality as described above, including a frame maximizing image quality generally and/or maximizing image quality at a location of interest within a physical space. Selection according to image quality may, for instance, minimize error and/or maximize accuracy and/or robustness to interference by any circumstantial factors as described above using without limitation any process for error prevention, detection, and/or correction as described in this disclosure, for instance by furnishing a greater ability to perform image recognition and resulting cross-checks. As a non-limiting example, image quality may vary with a flickering and/or intermittent light source, or as caused by intermittent interruptions, such that image selection based on image quality may capture a relatively low-noise, focused image, when an intermittent light source is high enough to provide better contrast and detail. In an embodiment, where image quality falls below a threshold as described above, processor 108 may adjust a sensing parameter 164.

With continued reference to FIG. 1, registration of plurality of frames may include detecting a motion of a vehicle through the car wash from the first frame to a second frame. Motion may be represented, without limitation as a vector; for instance x, y, and z components of motion may be detected using any process described in this disclosure for detection and/or determination of motion; each component may be formed by aggregation of a components detected from a series of motions between first frame and second frame. Motion detection may be synchronized to frame rate, for instance as coordinated by a central clock and/or one or more peripheral device clocks and/or counters. Although motion has been described here as represented in vector form, motion may be represented with any alternative or additional data structure, including any mathematical equivalent to a motion vector. Detecting the motion of the vehicle from the first frame to the second frame may include detection of the motion using sensor 124. Detection may alternatively or additionally include detecting motion of an object in field of vision relative to sensor 124; object may include a vehicle or any other object as detected, without limitation, using an image classifier as described above. Vectors detected in two or more processes may be combined by averaging together or otherwise aggregating components to produce a composite vector, unless image quality falls below a threshold level as described below, in which case only sensor 124 detection may be used, where threshold may be stored as a configured numerical quantity.

With continued reference to FIG. 1, detection of motion using detected motion of objects in field of vision may be contingent on image quality; for instance, in low-light conditions and/or under other circumstances in which picture quality makes image recognition problematic, processor 108 may avoid use of image detection and/or classification to detect motion. As a non-limiting example, processor 108 may detect image quality in the plurality of frames, comparing the image quality to a preconfigured threshold, stored for instance as a numerical quantity, and using the motion of an object in field of vision only if the image quality satisfies the preconfigured threshold. "Image quality," as used in this disclosure may include without limitation, a score representing contrast level, a degree of noise, and/or a degree of blurriness, and/or an aggregation and/or addition of two or more such scores. Contrast, blurriness, and some kinds of noise may be detected using a fast Fourier transform (FFT) or other degree of variation detection, where an FFT may show a predominance of lower frequency across the signal for images with degraded contrast, increased blurriness, and/or increased noise. Alternatively, or additionally, a classifier of like photographic images may be used to detect higher and lower quality images, for instance and without limitation as taught by user entries identifying image quality; classifier may be trained and/or implemented, without limitation, as described above for training and/or implementation of an image classifier.

With continued reference to FIG. 1, an object and/or shape identified using an image classifier, such as a portion of a vehicle, may be assigned an object identifier by processor 108. Processor 108 may further record one or more sets of coordinates describing location of an identified object; coordinates may include a set of coordinates of an approximate geometric center of object, coordinates of a plurality of vertices of polygonal approximations of surface features, or the like. Any such coordinates and/or object identifier may be transmitted to processor 108 and/or storage 120 by processor 108.

With continued reference to FIG. 1, processor 108 may generate an affine motion transformation as a function of the detected motion and calculates a second registration of the second frame to the field coordinate system. An "affine motion transformation," as used in this disclosure, may include any mathematical description usable to describe an affine motion of pixels in a display relative to field coordinate system, where "affine motion" is a motion within a space, such as three-dimensional space, which preserves ratios of lengths of parallel line segments. For instance, and without limitation, affine transformations in three dimensions may be represented by 4×4 matrices. For instance, a translation by a vector [x, y, z] in x, y, and z components of motion according to a Cartesian coordinate system may be represented by the four-by-four matrix:

$$\begin{bmatrix} 1 & 0 & 0 & x \\ 0 & 1 & 0 & y \\ 0 & 0 & 1 & z \\ 0 & 0 & 0 & 1 \end{bmatrix}$$

Rotations in three dimensions can be represented generally by 4×4 matrices as well. For instance, rotations may be represented by multiplying each coordinate set by a matrix computed using Euler angles $\psi$, $\theta$, and $\phi$, representing rotations confined to the yz plane, the zx plane, and the xy plane; these angles may be referred to as roll, yaw, and pitch, respectively. Generally, rotations may be represented by a matrix M, computed as follows:

$$M = \begin{bmatrix} 1 & 0 & 0 \\ 0 & \cos(\psi) & -\sin(\psi) \\ 0 & \sin(\psi) & \cos(\psi) \end{bmatrix} \begin{bmatrix} \cos(\theta) & 0 & \sin(\theta) \\ 0 & 1 & 0 \\ -\sin(\theta) & 0 & \cos(\theta) \end{bmatrix} \begin{bmatrix} \cos(\phi) & -\sin(\phi) & 0 \\ \sin(\phi) & \cos(\phi) & 0 \\ 0 & 0 & 1 \end{bmatrix}$$

Affine transformations may be represented, without limitation, using any alternative or additional mathematical representations and/or processes. Calculation and derivation of linear transformations may be performed, without limitation, using an FPGA, ASIC, or other dedicated hardware module designed to perform rapid arithmetic; trigonometric functions may, as a non-limiting example, be implemented as lookup tables stored, for instance, in read-only memory (ROM) or the like. Alternatively, or additionally, one or more such storage and/or processes may be performed by microprocessors, microcontrollers, or the like, for instance in assembly language or in higher-order languages. Lookup tables, transformation computations, and/or storage of vector and/or matrix values may be performed redundantly, for use in error detection and/or correction, as described in further detail below. Processor 108 may repeat the above-described process to register a plurality of frames and/or each frame of plurality of frames based on registration of first frame.

With continued reference to FIG. 1, in an embodiment, and where image quality is sufficiently high according without limitation, to threshold comparisons as described above, registration of first frame to field coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras for a stereoscopic display, as described above, image recognition and/or edge detection software may be used to detect a pair of stereoscopic views of images of an object, such as an object in a physical space; two stereoscopic views may be compared to derive z-axis values of points on object permitting, for instance, derivation of further z-axis points within and/or around the object using interpolation. In an embodiment, x and y axes may be chosen to span a plane common to two cameras used for stereoscopic image capturing and/or an xy plane of a first frame; a result, x and y translational components and $\phi$ may be pre-populated in translational and rotational matrices, as described above, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that a vehicle wheel is substantially orthogonal to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. Of note, where two camera views and x-y coordinates chosen for a common plane are used as described above, only z coordinates may be derived in this manner. Z-coordinates, or in the case of use of successive frames from a single camera, may be further iteratively compared to objects detected in additional frames to further minimize error functions.

With continued reference to FIG. 1, processor 108 is further configured to adjust an operational parameter 180 of a car wash component 182 based on the user data 132 and the sensor data 152. "An operational parameter," as used herein, is defined as a value defining an operational characteristic of a car wash component 182. A "car wash component," as used herein, is defined as a physical element of a car wash. For example, a car wash component may include a cleaning device such as a brush, a sprayer, a chemical tire applicator, or a conveyor, a light, a display, a fluid reservoir, a speaker or other audio device, and the like. For example, an operational parameter may be a rotational speed of a brush, a position of a brush, a sprayer fluid flow rate, a sprayer nozzle position, sprayer fluid additive flow rate (e.g. soap flow rate, wax flow rate, and the like), sprayer fluid temperature, sprayer fluid additive temperature (e.g. soap or wax temperature), a subset of nozzles turned off on a multi-nozzle system (e.g. every other nozzle turned off for a smaller vehicle), a power of a light, a luminosity of a light, a color of a light, a lighting pattern such as series of luminosities over time, a series of colors over time, a frequency of flashing that matches an RPM of a brush, a movement pattern of a brush synced to a display pattern of a light or display, an audio pattern or sound emitted from a speaker such as sound effects or music, or the like. Additionally or alternatively, processor 108 may adjust an operational parameter 180 based on the location of a vehicle, one or more dimensions of a vehicle, a cleaning operation being performed on a vehicle, a surface profile of a vehicle, a vehicle contamination status, and the like. In an embodiment, processor 108 may be configured by instructions contained on memory 112 to determine to turn a sprayer nozzle on in order to rinse a vehicle when the sensor 124 detects that front bumper has reached a predetermined location and then may turn the spray nozzle off when the sensor 124 detects the rear bumper reaches the same location. While the spray nozzle is on, processor 108 may configure a car wash component such as one or more LED lights positioned at the sprayer nozzle to display a particular color based on the user data 132, e.g. user data 132 may indicate that a user prefers the color blue, and processor 108 may display the color blue in response. The position of the lighting may make it appear to the user that the water is glowing blue, and may increase a user's satisfaction with the car wash. Processor 108 may additionally control an operational parameter 180 of a conveyor or similar mechanism for moving the vehicle through the car wash such as a speed of a conveyor, a location to stop the conveyor (and the vehicle), a direction of the conveyor, and the like.

With continued reference to FIG. 1, processor 108 is further configured to alter an operational state 184 of the car wash component 182 based on the user data 132, the sensor data 152, and the adjustment to the operational parameter 180. A "operational state," as used herein, is defined as any aspect of a car wash component 182 that can be described by a physical phenomenon. Examples of operational states include rotation of a cleaning brush, an LED or other light-emitting device emitting light, a display displaying information, a sprayer emitting fluid, a sprayer not emitting fluid, a speaker emitting sound or not emitting sound, and the like. In an embodiment, user data 132 may indicate that a user would like strobing pink lights accompanying their car wash. In an embodiment, adjustment or alteration of operational state 184 of a car wash component 182 may be triggered by one or more motion sensors in accordance with the disclosure. For example, an ultrasonic motion sensor may be placed next to a conveyor of a car wash. A vehicle moving through the car wash may induce a signal from the ultrasonic motion sensor when the vehicle is within a threshold distance of the sensor. When processor 108 receives sensor data 152 from the proximity sensor 124, processor 108 may control a speaker and/or LED to turn on and or emit one or more sounds or lights respectively. The sensor data 152 may indicate the position of the vehicle as it moves through the car wash and the processor 108 may control the operation of car wash components 182 as the vehicle travels through the car wash. For example, when a sprayer starts spraying water and/or soap, an LED disposed at the nozzle of a sprayer may turn on as well and give the fluid the appearance of glowing a certain color such as pink. In an additional or alternative embodiment, a sound effect, strobe effect, or other lighting effect may match a frequency of an RPM of a brush (the RPM being specified by the operational parameter) when certain brushes are activated. Examples of a light-emitting device include a display, a light (such as a lamp, a light bulb, a neon light, etc.), a light-emitting diode (LED), a projector, a laser, a strobe light, an incandescent light, a fluorescent light, a halogen light and the like. Examples of a projector may include a DLP projector, LCD projector, LED projector, LCOS projector, CRT projector, and the like. Car wash component 182 may be configured to project digital content on top of the semi-translucent foam for a preset duration of time. For example, the digital content may be displayed on top of foam dispersed on a window of the vehicle. "Foam," as used herein, is a mass of fine bubbles. The bubbles may be formed in or on the surface of a liquid or from a liquid. The foam may include a semi-translucent foam configured to cover windows of a vehicle. "Semi-translucent foam, as used herein is foam that partially allows the passage of light, as in partially see through. Foam may include snow foam. "Snow foam," a used herein is foamed detergent configured to dwell on a surface for a period of time before rinsing. Snow foam may be a white foam detergent that activates when sprayed onto a surface. For example, snow foam may be sprayed onto a vehicle at the begging of a car wash process. Foam may be composed of alcohols, vinegars, soaps, water, an aqueous film forming foam concentrate, fluorocarbon or hydrocarbon surfactants, various solvents and stabilizers, gels, and the like. "Digital content," as used herein is, any content that exists in the form of digital data. Digital content may include videos, photographs, and other types of digital media. In an embodiment, digital content may additionally be representative of items such as photographs, statues, buildings, paintings, art, and the like. The threshold for the concentration requirement may be generated based on of the size, shape, and orientation of display area. In an embodiment, car wash component 182 may include a projection device as disclosed in U.S. Nonprovisional application Ser. No. 18/195,675, filed on May 10, 2023, and entitled "AN APPARATUS AND METHOD FOR DISPLAYING DIGITAL CONTENT ONTO A VEHICLE" the entirety of which is incorporated herein by reference.

With continued reference to FIG. 1, the car wash component of apparatus 100 may comprise a first car wash component and a second car wash component, for example of the type specified above. Processor 108 is further configured to alter an operational state 184 of the first car wash component 182 based on an entertainment parameter 196 or an operational parameter of the second car wash component 182. In an embodiment, processor 108 may be further configured to alter an operational state 184 of the second car wash component 182 based on an entertainment parameter 196 or an operational parameter of the first car wash component 182. For example, an operational state 184 of a second car wash component 182 may be an intensity of a sound effect from a speaker or an intensity of an LED light. An operational parameter of a second car wash component 182 may include an RPM of a cleaning brush. In an embodiment, as the RPM of the brush increases, the light intensity of the LED light may increase. In an additional or alternative embodiment, processor 108 may control a brush or sprayer to physically or fluidically contact a vehicle being cleaned in time with music being played in the car wash via speakers. For example, a sprayer may emit cleaning fluid at a flow rate that varies proportionally with a frequency and amplitude of the music. In an embodiment, a first car wash component 182 may be a cleaning device and a second car wash component may be a light or LED. In an additional or alternative embodiment, a first car wash component 182 may be a display, a light, an LED, a laser or lasers, or a projector. In an additional or alternative embodiment, the second car wash component is at least one of a brush, a sprayer, or a chemical tire applicator in accordance with the above description. An entertainment parameter 196 may be included in user data 132. An "entertainment parameter," as used herein, is defined as a value or indicator specifying an operational parameter for a car wash component related to entertainment for a user. For example, an entertainment parameter 196 may include a song to play on a speaker as a vehicle travels through the car wash, an image to be projected on foam or part of a vehicle (e.g. the windshield, window, surface of the vehicle, etc.) as a vehicle travels through the car wash, a movement and/or operational pattern for car wash component 182 (e.g. a foam sprayer which deposits foam in the shape of a smiley face on a windshield), a user selection for operation of a car wash component 182, and the like. In an embodiment, car wash component 182 may be or include projector 162, LED 166, speaker 170, or another component consistent with the disclosure of the invention.

With continued reference to FIG. 1, displaying digital content on top of the semi-transparent foam may incorporate an augmented reality (AR) display. "Augmented reality," is the digital overlay. For example, AR may include digital visual elements, sounds, or other sensory stimuli delivered via technology. Car wash component 182 may be movable. For example, car wash component 182 may be joined to a pole, shaft, or arm at a joint, such as axial joint, rotary joint swivel joint, and the like. In some embodiments, car wash component 182 may be attached to a robotic arm, actuators, an extendable shaft, a rotary track, and the like. In some embodiments, processor 108 may control and adjust a movement and an angle of car wash component 182 by controlling the function of an arm, such as a robotic arm communicatively connected to the computer device. For example, computing device may signal a robotic to arm to point car wash component 182 at the display area of a vehicle.

With continued reference to FIG. 1, user data 132 may comprise membership information 186 for a user. "Membership information," as used herein, is defined as data related to an established business contract between a user and a service provider. In an embodiment, membership information 186 may indicate that a user pays for a monthly membership which gives the user up to a certain number of car washes per month, for example 5 car washes per month. Membership information 186 may include a monthly premium, a number of car washes per month, membership tier 188 ("membership tier" is defined as a level of membership and associated services), custom services such as detailing, wax, buffing, etc., user preferences, payment information, user information such as name and address, vehicle information such as license plate, VIN, make and model, vehicle dimensions, and the like.

With continued reference to FIG. 1, processor 108 may generate a unique token 190 as a function of the membership tier. A "unique token," as used herein, is defined as a digital element indicating information unique to a user or entity. A unique token may be stored on an immutable sequential listing (defined below) indicating a relationship between two data elements. In an additional or alternative embodiment, unique token 190 may be stored on storage 120, memory 112, or any suitable storage location. In an embodiment, the two data elements are a user and their membership tier. In an embodiment, the unique token 190 is generated as a function of the membership tier by generating a hash encoding the membership tier into the unique token 190. In an embodiment, a unique token 190 may include an indication of a user membership tier 188, user data 132, car wash preferences 136, a cryptographic hash, a user preference for a particular car wash functionality (such as hot water vs. cold water), a user preference for a particular car wash element (e.g. the user may prefer quiet brushes to loud brushes), and the like. An immutable sequential listing is described in greater detail with respect to FIG. 4 below. A unique token 190 may be a non-fungible token (NFT). An NFT may include an association between the NET and a user. Association with an NFT may include incorporation in the NFT and/or in a record, such as an immutable sequential listing posting, referring to and/or creating the NFT, of one or more elements of data associated with and/or linked to the data associated with and/or represented by the NFT. For instance, NFT may contain and/or be linked to a representation of data associated with and/or represented by the NFT, where the representation may include a uniform resource locator (URL) or other uniform resource identifier (URI) indicating the data and/or a location where the data may be found and/or viewed, a cryptographic hash of the data, a secure proof of the data and/or proof of knowledge of the data and/or a digital signature created using such proofs and/or the data and/or generated by a person or device associated therewith using, for instance an immutable sequential listing posting or the like, an identifier such as a universally unique identifier (UUID), a globally unique identifier (GUID), an identifier assigned within a system, platform and/or immutable sequential listing, a database record or other memory location of data, and/or any combination of the above.

With continued reference to FIG. 1, processor 108 may position at least one cleaning device 144 based on the vehicle dimension data 156. A "cleaning device," as used herein, is defined as a device used to remove a stain, dirt, or other contamination from a surface of a vehicle. A cleaning device may include a brush, a sprayer, a hose, a chemical tire applicator (CTA), and the like. A "brush" is a cleaning device that removes dirt and other vehicle contaminations by physically rubbing it off of the vehicle. Examples of brushes include c-channel brushes, spaghetti brushes, bristle brushes, starfoam top brushes, cloth brushes, foam brushes, tire brushes, wheel brushes, mitter curtains, polishing brushes, highside washers, low side washers, rocker brushes, wraparound brushes, top brushes, and the like. A "sprayer," as used herein, is defined as an object configured to emit a fluid. Examples of sprayers include a tube with an adjustable nozzle, a pipe with a plurality of adjustable openings for spraying water, a hose, and the like. For example, a sprayer may comprise a hollow semicircular arch with a predetermined number of apertures or nozzles for spraying water at a wide variety of angles, each of the nozzles equally spaced from one another. A sprayer nozzle may have an electric motor communicatively connected to processor 108 allowing the sprayer nozzle to be adjusted by processor 108 to control spray pattern, affected spray area, wetted part of a vehicle, fluid exit speed, and the like. Pressurized water may be forced through the sprayer towards a vehicle. In an embodiment, the water may be combined with soap and/or wax to assist in cleaning the vehicle. In an embodiment, the flow rate of water, soap, wax, and/or other additives may be controlled by processor 108. A chemical tire applicator is a device including an applicator and reservoir containing a chemical mixture formulated to break down brake dust stuck to rims, wheels, tires, brake assemblies, and the vehicle itself. The applicator sprays or otherwise transfers the chemical mixture to the tires and areas of the vehicle proximal to the tires to remove brake dust. A chemical tire applicator may be located below a threshold height to help ensure the chemical mixture is only applied to the wheels and tires.

With continued reference to FIG. 1, processor 108 may utilize the vehicle dimension data 156 to position a cleaning device 144 and ensure the vehicle is thoroughly cleaned. In an embodiment, processor 108 determines an area of effect 168 for a cleaning device. An "area of effect," as used herein, is defined as one or more locations in a physical space that a cleaning device, in operation, will interact with or affect. An area of effect 168 may be three dimensional. For example, an area of effect 168 of a brush may include a volume where a brush will make contact with an object inside the volume when the brush is spinning or otherwise being operated. An area of effect 168 of a sprayer may include the volume where a fluid emitted from the sprayer would make contact with an object or surface inside the volume. An area of effect 168 of a CTA may be a volume reached by a chemical mixture emitted from the CTA. Processor 108 may be configured by instructions contained on memory 112 to control a position of a cleaning device such that the area of effect 168 at least partially overlaps a determined portion of a vehicle. For example, processor 108 may be configured by instructions contained on memory 112 to adjust a position of a brush so that the area of effect 168 of the brush includes the roof of a vehicle. In an additional or alternative embodiment, processor 108 may be configured by instructions contained on memory 112 to select an area of contiguous locations on vehicle surface profile 160 (for example elements of a LIDAR point cloud) and determine a movement path for cleaning device 144 such that the area of contiguous locations on the vehicle surface profile 160 lies inside a volume defining an area of effect 168 of the cleaning device. For example, a roller brush may be oriented such that the area of effect 168 defines a cylinder 10 feet in length and having a diameter of 3 feet, where the center axis of the cylinder is parallel to the ground and perpendicular to a direction of motion of a vehicle through the car wash. The roller brush may be capable of moving vertically up or down and may be controlled by processor 108 to move from an initial position where the center axis of the roller brush is 10 feet above the ground to a second position. The processor 108 may determine that a vehicle surface profile includes a maximum height 4.5 feet above the ground and processor 108 may be configured by instructions contained on memory 112 to control the position of the roller brush such that the center axis of the roller brush is no less than 0.5 feet above the maximum height of the vehicle. Processor 108 may determine the position of the vehicle as it moves through the car wash using sensor 124 and may lower the roller brush from a height of 10 feet above the ground to a height of 5.5 feet above the ground based on position information received from sensor 124. Processor 108 may be configured by instructions contained on memory 112 to determine that the roof of the vehicle is in the area of effect 168 of the brush when the roller brush is at a height of 5.5 feet above the ground and ensure the roof of the vehicle is cleaned.

With continued reference to FIG. 1, processor 108 may detect a vehicle contamination 172 of the at least one cleaning device 144 based on the sensor data 152. "A vehicle contamination," as used herein, is defined as material impermanently attached to a surface of the vehicle which discolors, obscures, or stains the vehicle. A vehicle contamination may include dirt, dust, mud, pollen, smudges, smears, liquids, gels, silt, soot, powder, grime, condiments, bird poop, and the like. A vehicle contamination 172 may have a shape and/or extent, which may be detected by sensor 124. For example, processor 108 may be configured by instructions contained on memory 112 to identify a vehicle surface profile 160 from the sensor data 152 such as camera or image sensor data. Processor 108 may then identify a color of the vehicle from the sensor data 152 as well as any locations on the surface of the vehicle that do not match the identified color of the vehicle. Processor 108 may further utilize image registration techniques as described above to associate points on the vehicle surface profile 160 with the location of the detected vehicle contamination 172. In an additional or alternative embodiment, processor 108 may be configured by instructions contained on memory 112 to segment the vehicle surface profile 160 into a grid with a predetermined number of subdivisions (e.g. grid squares or grid elements) containing a contiguous set of elements of vehicle surface profile 160 (such as a number of pixels, a number of points of a LiDAR point cloud, etc.). Processor 108 may then compare a determined vehicle color with the sensor data 152 for each grid. Processor 108 may additionally or alternatively determine an intensity value within each grid. An "intensity value," as used herein, is defined as a numerical value representing brightness of a pixel. The numerical value may be between a minimum value representing black (typically 0), and a maximum value representing white (e.g. 255 for an 8-bit representation), inclusive. Values between a minimum and a maximum specify a grayscale or color value. Processor 108 may receive sensor data 152 that corresponds to intensity values for an object such as a vehicle and determine a color or grayscale value associated with the vehicle, for instance the paint color of the vehicle. Processor 108 may then identify contamination pixels on the vehicle surface profile 160 by determining intensity values matching vehicle paint or surface color values that are adjacent to values differing from vehicle paint or surface color values. Processor 108 may select the pixels or elements with values differing from vehicle paint or surface color values and group the selected pixels together as a vehicle contamination. Additionally or alternatively, processor 108 may designate a grid element for inclusion in an area of effect 168 of a cleaning device if a threshold number of pixels have intensity values that differ from a determined threshold intensity value.

With continued reference to FIG. 1, processor 108 may correlate a location of the vehicle contamination 172 to at least one spatial coordinate 176 based on the vehicle dimension data 156 and adjust the operational parameter 180 of the at least one cleaning device 144 based on the location of the vehicle contamination 172. A "spatial coordinate," as used herein, is defined as coordinate in a 3D coordinate system specifying a location relative to a reference point. A spatial coordinate system may use and appropriate units including yards, feet, inches, meters, centimeters, millimeters, or the like. A spatial coordinate 176 may be a specified as a set of X, Y, and Z coordinates such as [18,0,4] which may be a number of feet from a reference point [0,0,0] located at the entrance of the car wash. The first X coordinate may be a number of feet along a conveyor belt, the second Y coordinate may be a number of feet from the middle of the conveyor belt, and the third Z coordinate may be a number of feet above the conveyor belt. [18,0,4] may specify a location 18 feet into the car wash along the conveyor belt, 0 feet from the middle of the conveyor belt, and 4 feet above the conveyor belt. Processor 108 may determine a 3D coordinate box consisting of 8 coordinates which define a 3D volume and include an identified vehicle contamination 172. Processor 108 may update the 3D coordinate box as the vehicle and vehicle contamination 172 move through the car wash. For example, processor 108 may correlate a vehicle contamination 172 to a spatial location within the coordinates bounded by the box defined by [1,1,1], [1,1,2], [1,2,1], [1,2,2], [2,1,1], [2,2,1], [2,1,2], and [2,2,2] and may confirm that the vehicle dimension data 156 and vehicle surface profile 160 overlap with that bounding box based on, e.g. the intensity values associated with a vehicle surface profile 160. Processor 108 may track the coordinates of the contamination box as the vehicle moves through the car wash, for instance using an affine transformation as described above.

With continued reference to FIG. 1, processor 108 may control or adjust an operational parameter 180 of at least one cleaning device 144 based on location of the vehicle contamination 172. For example, processor 108 may determine the bounding box above corresponds to the roof of a vehicle. Processor 108 may determine that a sprayer device has an area of effect 168 within the coordinates [10, −2, 0], [14, −2, 0], [10, 2, 0], [14, 2, 0], [10, −2, 8], [14, −2, 8], [10, 2, 8], [14, 2, 8]. Processor 108 may then track the contamination coordinates and turn the sprayer on when the coordinate bounding box containing the vehicle contamination 172 overlaps with the sprayer area of effect 168 and turn off the sprayer when the coordinate bounding box no longer contains the vehicle contamination 172. Processor 108 may adjust operation of both cleaning device 144 and sensor 124 when it is determined that the vehicle contamination 172 bounding box coordinates and cleaning device area of effect 168 overlap. For example, processor 108 may increase a sensor property (e.g. the sampling rate, sensor resolution, zoom level, sensor power, sensitivity, response time, linearity, drift, hysteresis, and the like) of sensor 124 when a vehicle contamination is in the area of effect 168 of a cleaning device 144 in order to determine how effectively the cleaning device 144 is removing the vehicle contamination 172. Additionally or alternatively, processor 108 may adjust an operational parameter 180 of a cleaning device 144, for example increasing a brush RPM, increasing a cleaning fluid temperature, increasing a proportion of soap in the cleaning fluid, increasing or decreasing a sprayer nozzle aperture or otherwise changing a sprayer nozzle aperture shape to effect an increase in the amount of soap suds generated by the spray, increasing or decreasing a sprayer nozzle aperture to change the area of effect 168 of the sprayer, increasing or decreasing a sprayer nozzle aperture to increase a fluid flow or emission velocity of a fluid spray, and the like.

With continued reference to FIG. 1, processor 108 may detect a surface discontinuity 192 in the vehicle surface profile 160 based on the sensor data 128 received from the sensor 124. A "surface discontinuity," as used herein, is defined as an opening or gap between two or more elements of a vehicle surface. In an embodiment, a vehicle surface profile 160 may consist of a LiDAR point cloud of a vehicle based on the sensor data 128. The vehicle surface profile 160 may consist of a collection of contiguous points that processor 108 has identified that define the surface of the vehicle. Processor 108 may determine that the sensor data 128 indicates that sensor data 128 indicates no surface has been identified at one or more coordinates adjacent to a coordinate where a surface of the vehicle has been positively identified. Processor 108 may compare the coordinate values to coordinates of the rest of vehicle surface profile 160 and determine that the coordinates having no indication of a vehicle surface profile are associated with a part of a vehicle such as the top of a driver's side window. In particular, processor 108 compares a sensor reading for each voxel or spatial coordinate element with the readings in each of the neighboring voxels. A "voxel" is defined as a digital representation of a 3D volume. For an example voxel in the middle of a 3×3×3 cubic group of voxels, the middle voxel will have 26 neighboring voxels. Processor 108 may compare a sensor reading (e.g. a 1 for a detected surface or a 0 for no detection) with a reference voxel and determine that there are less than a threshold number of neighboring voxels where a surface element was detected, for instance using edge detection algorithms as described herein. Processor 108 may identify voxels with zero neighboring surface elements and define these voxels as part of a discontinuity. Processor 108 may determine a surface discontinuity exists if the number of contiguous neighboring voxels is greater than a threshold. For example, processor 108 may determine, based on the number of neighboring voxels with no surface detected, that the driver's side window is open and the driver may be sprayed by water if one or more sprayer devices are activated. Processor 108 may additionally or alternatively utilize computer vision techniques to identify components of a vehicle such as a door, a window, a windshield, an A/B/C/D pillar, a trunk, a wheel, a tire, a bumper, or any suitable component. For example, processor 108 may compare a side profile image of a vehicle with a reference image of a generic vehicle or a reference image of a vehicle of the same make and model as outlined below. Processor 108 may determine that the two images do not match due to a surface discontinuity 192 in the vehicle surface profile. A surface discontinuity 192 may be an open vehicle window, an open sunroof, an open hood or trunk, or the like.

With continued reference to FIG. 1, processor 108 may reposition the at least one cleaning device 144 until the at least one cleaning device 144 interacts with the vehicle contamination 172 while simultaneously not interacting with the surface discontinuity 192. "Interact," as used herein in reference to a cleaning device 144 or cleaning device area of effect 168, is defined as fluidically or physically contacting or emitting a fluid into or onto. In an embodiment, processor 108 may determine a location of vehicle contamination 172 and a location of a surface discontinuity 192. Processor 108 may then determine a position and/or orientation for a cleaning device 144 such that the area of effect 168 of the cleaning device 144 in operation interacts with the vehicle contamination 172 while simultaneously not interacting with the vehicle surface discontinuity 192. For example, processor 108 may determine an initial position and/or orientation of a cleaning device 144 and an associated area of effect 168 of the cleaning device based on the initial position and/or orientation. Processor 108 may then calculate a predetermined adjustment to the position and/or orientation of the cleaning device 144, for instance moving the cleaning device a set increment (e.g. the smallest possible increment) and calculating, based on the new position and/or orientation, the corresponding area of effect 168. The processor 108 may repeat this adjustment process until the area of effect 168 of cleaning device 144 partially or wholly overlaps with vehicle contamination 172 while not overlapping at all with surface discontinuity 192. In an additional or alternative embodiment, processor 108 may apply a transformation to area of effect 168 such as an affine transformation to determine an orientation of area of effect 168 that overlaps partially or wholly with vehicle contamination 172 while not overlapping at all with surface discontinuity 192. Processor 108 may then determine the corresponding position and/or orientation of cleaning device 144 corresponding to the transformed orientation of area of effect 168. If the position and/or orientation of cleaning device 144 is possible, processor 108 may then move the cleaning device to that position to affect removal of vehicle contamination 172 without interacting with vehicle surface discontinuity 192.

With continued reference to FIG. 1, processor 108 may match the vehicle surface profile 160 with a vehicle make and model 194. A "vehicle make and model," as used herein, is defined as the manufacturer of the vehicle and the manufacturer's model designation for the vehicle. For example, the make and model of a vehicle may be "Ford Explorer" or "Toyota Yaris." Make and model may include model year, such as "2006 BMW M3." Storage 120 may include a database of vehicle make and model information, such as a list of all makes and models sold within a particular country for a given time period. Storage 120 may additionally include one or more models associated with each make and model 194 such as a wireframe model, a 3D LiDAR point cloud, a drawing, a 3D mesh, an image, a vehicle profile, and the like. Processor 108 may be configured by instructions contained on memory 112 to singly or iteratively perform an affine transformation on point cloud data or image data determined from sensor data 152 and then register one or more frames of the point cloud or image data to a vehicle make and model 194, thus matching the vehicle surface profile 160 with the vehicle make and model 194. Processor 108 may additionally or alternatively determine make and model 194 from sensor data 152 by extracting a manufacturer logo and/or an indication on the vehicle such as a decal or written identifier of the vehicle model. For example, a vehicle trunk may have writing indicating that the vehicle model is "Explorer," which processor 108 may detect utilizing optical character recognition techniques as described below.

With continued reference to FIG. 1, processor 108 may match the vehicle surface profile 160 with a vehicle make and model 194. A "vehicle make and model," as used herein, is defined as the manufacturer of the vehicle and the manufacturer's model designation for the vehicle. For example, the make and model of a vehicle may be "Ford Explorer" or "Toyota Yaris." Make and model may include model year, such as "2006 BMW M3." Storage 120 may include a database of vehicle make and model information, such as a list of all makes and models sold within a particular country for a given time period. Storage 120 may additionally include one or more models associated with each make and model 194 such as a wireframe model, a 3D LiDAR point cloud, a drawing, a 3D mesh, an image, a vehicle profile, and the like. Processor 108 may be configured by instructions contained on memory 112 to singly or iteratively perform an affine transformation on point cloud data or image data determined from sensor data 128 and then register one or more frames of the point cloud or image data to a vehicle make and model 194, thus matching the vehicle surface profile 160 with the vehicle make and model 194. Processor 108 may additionally or alternatively determine make and model 194 from sensor data 128 by extracting a manufacturer logo and/or an indication on the vehicle such as a decal or written identifier of the vehicle model. For example, a vehicle trunk may have writing indicating that the vehicle model is "Explorer," which processor 108 may detect utilizing optical character recognition techniques as described below.

With continued reference to FIG. 1, processor 108, machine learning module 116, or another device may utilize a machine learning classifier in accordance with the disclosure to classify vehicle make and model 194. For example, a classifier may be configured to output at least a datum that labels or otherwise identifies a set of data that are clustered together, found to be close under a distance metric such as a norm, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108, machine learning module 116, or another device may classify elements of training data into different vehicle makes and/or models. Processor 108, machine learning module 116, or another device may further classify model years, colors, or editions of the same make and model year, such as LE, SE, and LEX editions of the same vehicle make and model and year. Processor 108, machine learning module 116, or another device may classify elements of training data based on vehicle shape, manufacturer badge, vehicle dimension, a training template, vehicle image data, vehicle LiDAR data (e.g. LiDAR data scans of a particular vehicle), vehicle license plate, or any suitable selection criteria. Processor 108 may retrieve data corresponding to vehicle make and model and existing improvements to vehicle make and model from storage 120, memory 112, machine learning module 116, or any suitable storage source.

With continued reference to FIG. 1, processor 108 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 108 may then calculate a likelihood table by calculating probabilities of different data entries and classification labels. Processor 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 108 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may be further configured to train a vehicle make and model classification machine learning model using the vehicle make and model classification training data. In a non-limiting embodiment, vehicle make and model classification training data is submitted to a machine-learning model, which generates a trained vehicle make and model classification machine learning model based on the correlated relationship or relationships. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from the vehicle make and model classification training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired vehicle make and model classification values at the output nodes. This process is sometimes referred to as deep learning.

With continued reference to FIG. 1, processor 108, machine learning module 116, and/or another computing device may utilize Optical Character Recognition or Optical Character Reader (OCR), Optical Word Recognition (OWR), Handwritten Text Recognition (HTR), Intelligent Character Recognition (ICR), or Intelligent Word Recognition (IWR) configured to automatically convert images of written text (such as writing indicating a vehicle model on the back of a trunk) into machine-encoded text. In some cases, OCR may recognize written text, one glyph or character at a time. In some cases, OWR may recognize written text, one word at a time, for example, for languages that use a space as a word divider. In some cases, ICR may recognize written text one glyph or character at a time, for instance by employing machine learning processes. In some cases, IWR may recognize written text, one word at a time, for instance by employing machine learning processes as disclosed herein. For example, processor 108 may receive or extract an image file from sensor data 128 containing an image of a portion of a vehicle, such as a trunk of the vehicle. Processor 108 may use OCR to determine the writing on the trunk indicating the model of the vehicle by comparing the written text on the trunk of the vehicle to a list of models retrieved from storage 120 by processor 108.

With continued reference to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-7.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 may adjust the operational parameter 180 based on the determined vehicle make and model 194. For example, processor 108 may determine the make and model 194 using techniques outlined above and may subsequently determine vehicle dimensions by retrieving dimensions associated with vehicle make and model 194 stored in storage 120. For example, information contained on storage 120 may be a database with make and models of various vehicles such as all vehicles sold in a particular country for the past 40 years. Once processor 108 has determined the vehicle make and model 194, processor 108 may retrieve one or more dimensions associated with the vehicle make and model 194 from storage 120. Processor 108 may then utilize the dimensions determined from the vehicle make and model 194 to adjust an operational parameter 180. For example, processor 108 may determine that the roof of a vehicle is 4.6 feet above the floor of the car wash and calculate that in order for a roof roller brush with a 3 foot diameter to clean the roof of the vehicle, the center axis of the roller brush must be lowered to between 4.6 feet and 6.1 feet above the floor of the car wash. Processor 108 may further determine that a maximum cleaning effect is achieved when the center axis of a roller brush is 1 foot above a surface to be cleaned such as a vehicle roof. Processor 108 may be configured by instructions contained on memory 112 to lower the roller brush to a height of 5.6 feet above the floor of the car wash to provide maximal contamination removal. Processor 108 may additionally or alternatively utilize a determined vehicle make and model 194 to determine dimensions of vehicle components which may be negatively affected by cleaning device 144. For example, processor 108 may be configured by instructions contained on memory 112 to lower an RPM of a brush when cleaning a rear hatch of a particular vehicle make and model 194 due to a manufacturing defect in the rear windshield wiper of that make and model which makes the windshield wiper particularly susceptible to breaking while being washed in a car wash. Processor 108 may then determine a movement profile (a "movement profile" of an object being defined as a sequence of positions traversed by the object over a set period of time) for the cleaning device 144 such that the area of effect 168 of the cleaning device 144 does not overlap at any point with a given vehicle component as the vehicle moves through the car wash.

With continued reference to FIG. 1, apparatus 100 may further comprise a user interface 140. A "user interface," as used in this disclosure, is a means by which the user and a computer system interact, including the use of input devices and software. "User data," as used herein, is data stored based on its relation to a user. A user interface may include a graphical user interface (GUI), command line interface (CLI), menu-driven user interface, touch user interface, voice user interface (VUI), form-based user interface, and the like. In an embodiment, user interface 140 may comprise a speaker and/or microphone In an embodiment, user interface 140 may include a display (such as a light emitting diode (LED) display, liquid crystal, quantum dot LED (QLED), organic LED (OLED), active-matrix organic LED (AMOLED), Super AMOLED, and the like), touch screen, or digital writing device. User interface 140 may comprise one or more means for receiving user input such as a keypad, keyboard, mouse, button, touchscreen, touchpad, knob, dial, slider, switch, or the like. User interface 140 may comprise one or more means for providing output such as a display, screen, speaker, vibrating motor (such as the type for vibrating smartphones), LED, light, buzzer, alarm, or the like. Processor 108 may personalize the user interface 140 based on generating a unique token 190 as a function of at least one car wash service selected by a user. For example, a unique token 190 may be generated based on a user selecting a light show for their car wash. A "light show" is a sequence of intensities and colors displayed by one or more lights over time. The user interface 140 may be personalized based on the unique token 190. For example, processor 108 may be configured by instructions contained on memory 112 to determine a user name, a user car wash preference, or the like from unique token 190 and display the determined information through the user interface 140. User data 132 may be additionally or alternatively received during an operation of a car wash, for example while a vehicle is being cleaned by at least one cleaning device 144 in the car wash.

With continued reference to FIG. 1, processor 108 may receive a car wash preference 136 through the user interface 140. A "car wash preference," as used herein, is defined as information obtained from a user related to an operation of a cleaning device 144 or other aspect of vehicle cleaning. Processor 108 may receive a car wash preference 136 prior to the commencement of a car wash operation (such as a vehicle cleaning operation) or during the car wash operation, or after the car wash operation has completed (for example, updating a preference for a subsequent car wash operation). For example, a car wash preference 136 may include an addition of a wax additive, an add-on service such as extra buffing step, an application of a waterproofing coating to some or substantially all of a vehicle, an instruction to only wash a specified portion of a vehicle such as a vehicle's wheels or roof, a maximum fluid temperature applied by a sprayer, inclusion or exclusion of soap in an applied fluid, an indication that a convertible roof is down so an area of effect 168 of any cleaner should not include any height greater than 2 feet above the floor of the car wash, and the like. A car wash preference 136 may be selected by user from a group of wash preferences presented to a user through the user interface 140 by processor 108. For example, a user interface may prompt a user with one or more choices related to a car wash process. For example, processor 108 may cause a display associated with user interface 140 to display a text prompt (such as "Would you like to add wax to the wash?") and two selectable input choices (e.g. "Yes" or "No"). The user may then respond to the prompt and processor 108 may adjust an operational parameter 180 of the one or more cleaning devices 144 based on the car wash preference 136. In an embodiment, processor 108 may adjust a weighting of a neural network by presenting a user with a list of operational parameters 180 and prompting the user to rank the operational parameters 180 in order of importance. The processor 108 may then alter the neural network weights such that the greatest weight is placed on the operational parameter 180 specified by the user as being most important, the second greatest weight is placed on the operational parameter 180 specified by the user as being the second most important, and so on down to the operational parameter 180 which the user specified as being least important. For example, processor 108 may present list of three operational parameters 180 through a user interface 140: "Remove all stains," "Don't spray water into the vehicle's open windows," and "Remove brake dust from the wheel wells." Processor 108 may further display a prompt on a display of user interface 140 related to the three operational parameters 180 such as "Please rank the following operational parameters in order of importance from 1 to 3, with 1 being the most important." Processor 108 may further display a text field where a user may enter a number from 1 to 3 for each operational parameter 180 using an input device such as a keyboard or digital keyboard displayed on a touchscreen included in user interface 140. The user may then enter 1 for "Don't spray water into the vehicle's open windows" indicating that this operational parameter 180 is of the greatest importance to the user, 2 for "Remove all stains," and 3 for "Remove brake dust from the wheel wells." Processor 108 may then determine that weighting of a neural network determining the positioning of at least one cleaning device 144 should be altered so that a buffer zone (e.g. a minimum distance between a vehicle component or a contiguous area of vehicle surface profile 160 [such as the open space formed between the top of a door frame and the top of an open window] and an area of effect 168 of a cleaning device 144) should be 40% greater than a default value stored in instructions contained on memory 112 and that a chemical tire applicator wash step should be omitted entirely.

With continued reference to FIG. 1, car wash preference 136 may be presented to a user based on the vehicle dimension data 156 and/or vehicle surface profile 160. For example, processor 108 may present a user with an image of the vehicle as detected by sensor 124 through user interface 140. The image of the vehicle may be positioned on a display adjacent to a text prompt indicating "Please circle areas of the vehicle that require particular attention," "Please indicate one or more areas or components of the vehicle which should be avoided," "A bumper sticker has been detected on your vehicle. Would you prefer that area to be avoided during cleaning?" or a similar prompt for instruction. A user may then use a touchscreen included in user interface 140 to respond to the prompt, for example by drawing a circle or closed shape around the area of the vehicle that they wish to be included or excluded from an area of effect 168 of a cleaning device 144. Determining a car wash preference 136 to present to a user based on the vehicle dimension data 156 may include determining which car wash preferences 196 if any to present to a user based on a comparison of a maximum dimension of a vehicle with a threshold dimension. For example, processor 108 may present a user with an option for a 1-minute drying of the vehicle for vehicles with a maximum dimension under 12 feet. Processor 108 may be configured by instructions contained on memory 112 to determine that it is not possible to dry a vehicle in less than 1 minute if any maximum dimension of the vehicle is greater than 12 feet and therefore will assess that the option should not be presented to a user.

With continued reference to FIG. 1, the car wash preference 136 may exclude one or more spatial coordinates 176 from an area of effect 168 of the one or more cleaning devices 144. For example, processor 108 may receive one or more spatial coordinates 176 from sensor 124, user interface 140, storage 120, or another source, as well as an instruction that the one or more spatial coordinates 176 are not to be included in an area of effect 168 of one or more cleaning devices 144. Processor 108 may then determine one or more positions or orientations corresponding to an area of effect 168 of one or more cleaning devices 144 such that the one or more spatial coordinates 176 are not included in area of effect 168. For example, processor 108 may be configured by instructions contained on memory 112 to determine an area of effect 168 for a cleaning device 144 when the cleaning device 144 is in an initial or default position and/or orientation. Processor 108 may be configured to then determine a movement profile of the cleaning device 144 to prevent the area of effect 168 of cleaning device 144 from including the one or more spatial coordinates 176. For example, processor 108 may be configured by instructions contained on memory 112 to generate a sequence of positions comprising a movement profile for a cleaning device 144 and calculate an area of effect 168 for each position in the sequence of positions. Processor 108 may calculate any additional coordinates corresponding to the portion of vehicle that should be excluded from area of effect 168 of cleaning device 144 as the vehicle moves through the car wash. In an embodiment, the one or more spatial coordinates 176 are updated as the vehicle moves through a car wash based on the tracked dimensions and/or locations of the vehicle within the car wash, for instance as detected by sensor 124. Processor 108 may dynamically calculate the area of effect 168 for the cleaning device 144 and adjust an operational parameter 180 of the cleaning device 144 as the vehicle moves through the car wash. For example, the operational parameter 180 may be an on or off status of a cleaning device 144 and if processor 108 determines that area of effect 168 includes or is within a threshold minimum distance of the one or more spatial coordinates 176 not to be included in the area of effect 168, processor 108 may adjust the operational parameter 180 to "off" in order to cease operation of the at least one cleaning device 144. Additionally or alternatively, processor 108 may discard any movement profiles for cleaning device 144 which result in an area of effect 168 including the one or more spatial coordinates 176. Processor 108 may iteratively calculate movement profiles until a movement profile satisfying the condition that each area of effect 168 of cleaning device 144 excludes the one or more spatial coordinates 176 at each position included in the satisfactory movement profile is found.

With continued reference to FIG. 1, processor 108 may adjust a sensing parameter 164 of the sensor 124 based on a physical characteristic 198 of a vehicle detected by the sensor 124. A "sensing parameter." as used herein, is defined as a characteristic of a sensor that relates to or controls the relationship between a sensed input and a resulting output signal. Examples of a sensing parameter 164 include sampling rate, sensor resolution, zoom level, sensor power, sensitivity, response time, linearity, drift, hysteresis, and the like. Examples of a physical characteristic 198 of a vehicle may include color, reflectivity, contrast with an environment, material, color pattern, shape, absorptivity, vehicle profile, and the like. In an embodiment, processor 108 may adjust a sensing parameter 164 of the sensor 124 when the color of the vehicle is within a threshold level of intensity of a vehicle contamination 172. For example, a sensor resolution level may be adjusted to increase the detail of the vehicle contamination 172 and the color of the vehicle detected and allow processor 108 to detect that a vehicle contamination 172 has been fully removed. In an embodiment, the sensing parameter 164 may be adjusted when processor 108 determines that an area of effect 168 of a cleaning device 144 partially or wholly includes a location of a vehicle contamination 172. This may allow processor 108 to better determine if the vehicle contamination 172 is being thoroughly removed. In an additional or alternative example, processor 108 may increase a zoom and resolution of an imaging sensor in order to better identify the extent of a vehicle contamination 172 and assess if the vehicle contamination 172 has been removed from the vehicle after a cleaning device 144 has been positioned to apply its area of effect 168 to the vehicle contamination 172.

Figure 2B:
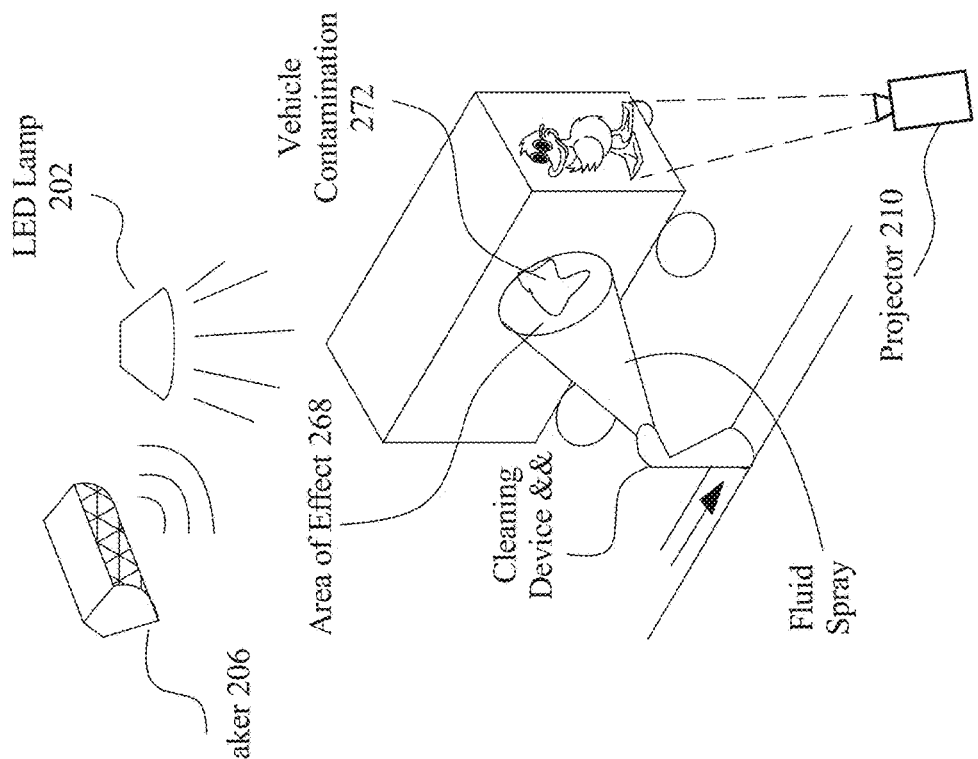
FIGS. 2A and 2B illustrate the repositioning of a cleaning device in a car wash.
Figure 2A:
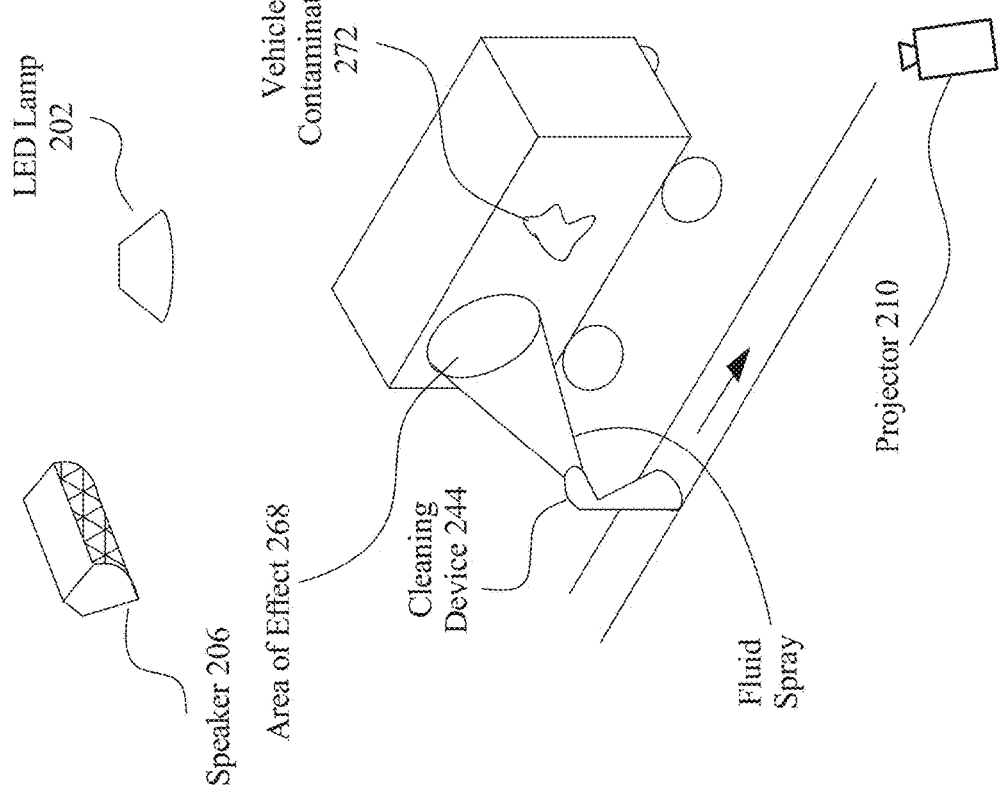

Now referring to FIG. 2A and FIG. 2B, the operation of car wash components (LED lamp 202, speaker 206, and projector 210) as well as repositioning of a cleaning device 244 such that an area of effect 268 overlaps with a vehicle contamination is illustrated. Cleaning device 244 may be repositioned by one or more signals or commands sent to actuators within or attached to cleaning device 244. An "actuator" as used herein is defined as a mechanism or device for converting a signal into physical force or motion. Actuators are described in further detail below.

Referring now to FIG. 2A, a cleaning device 244 comprising a sprayer is spraying a fluid spray at a vehicle. The processor 108 determines that the area of effect 268 is not overlapping with vehicle contamination 272 using via sensor data 128. Processor 108 then repositions the cleaning device, in this case by moving it to the right along a track as illustrated by the arrow. Further, operational state 184 of LED lamp 202, speaker 206, and projector 210 is "off," e.g. LED lamp 202 and projector 210 are not emitting light and speaker 206 is not emitting sound.

Referring now to FIG. 2B, the processor 108 has repositioned the cleaning device 244 such that the area of effect 268 is now overlapping (and over time, removing) vehicle contamination 272. Once processor 108 repositions cleaning device 244, processor 108 may alter operational state 184 of LED lamp 202, speaker 206, and/or projector 210, which are shown in FIG. 2B emitting light and sound and projecting an image respectively. For example, once processor 108 determines an area of effect 268 overlaps with a vehicle contamination 272, processor 108 may alter an operational state 184 of LED lamp 202, speaker 206, and/or projector 210. For example, processor 108 may play a sound effect from speaker 206 related to cleaning or may alter an intensity or color of light emitted from LED lamp 202 when area of effect 268 is overlapping vehicle contamination 272. Additionally or alternatively, processor 108 may project a logo on a surface within the car wash once a vehicle is clean to indicate that the cleaning of the vehicle is complete.

With continued reference to FIGS. 2A and 2B, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion In some cases, an actuator may be understood as a form of automation or automatic control.

With continued reference to FIGS. 2A and 2B, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston, any difference in resultant force between the two sides of the piston causes the piston to move.

With continued reference to FIGS. 2A and 2B, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 2A and 2B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIGS. 2A and 2B, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 2A and 2B, in some embodiments, actuator may include a pneumatic actuator In some cases, a pneumatic actuator may enable considerable forces to be produced from relatively small changes in gas pressure. In some cases, an pneumatic actuator may respond more quickly than other types of actuators, for example hydraulic actuators A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 2A and 2B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential, electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

Figure 3:
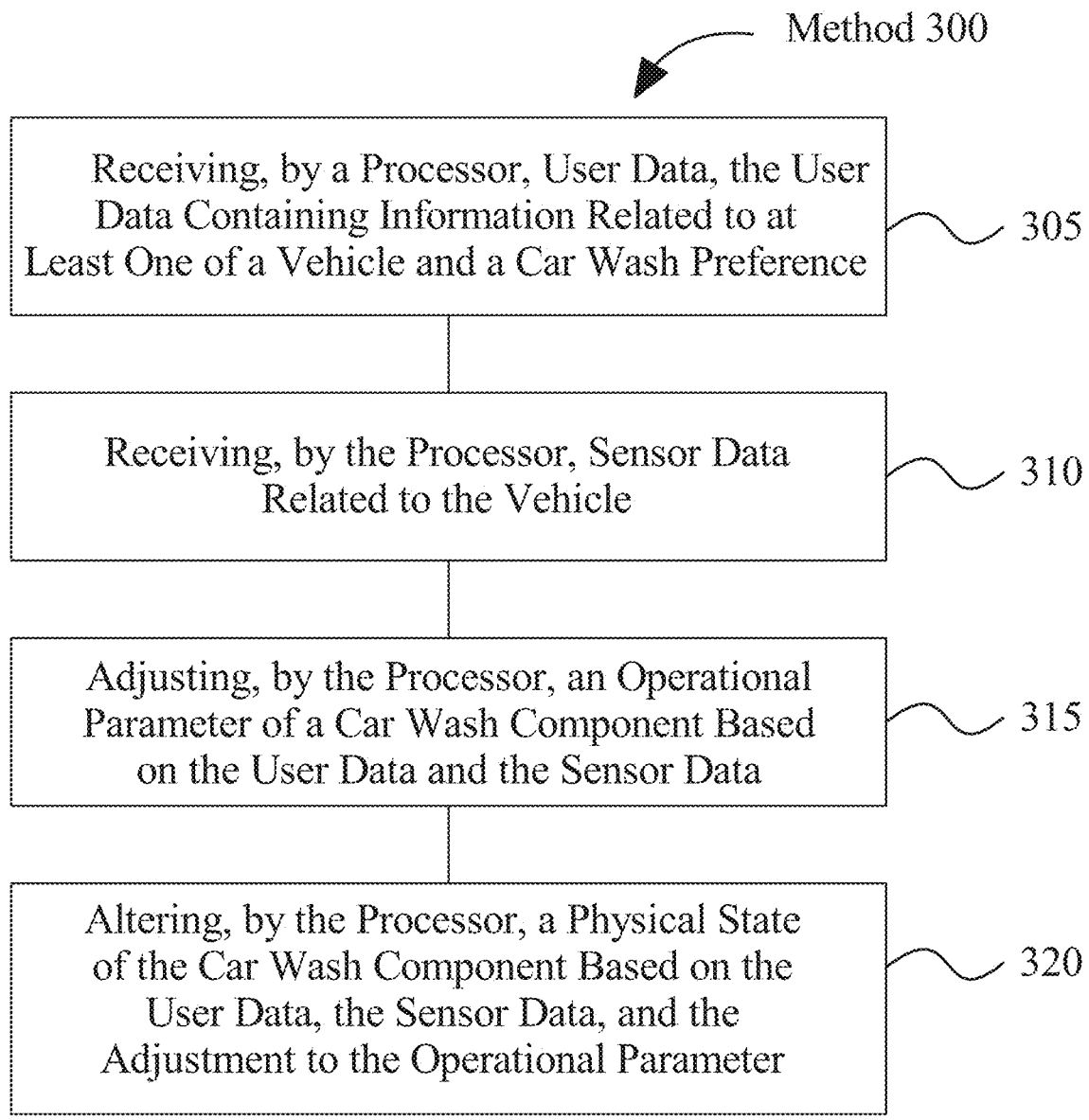
FIG. 3 illustrates the steps of a method for improving a user experience in a car wash.

Now referring to FIG. 3, a method 300 for dimensioning a vehicle is described. Method 300 comprises the steps 305-320 of 305, receiving, by a processor, user data, the user data containing information related to at least one of a vehicle and a car wash preference; 310, receiving, by the processor, sensor data related to the vehicle; adjusting, by the processor, an operational parameter of a car wash component based on the user data and the sensor data; and 320 altering, by the processor, an operational state of the car wash component based on the user data, the sensor data, and the adjustment to the operational parameter.

Continuing to refer to FIG. 3, step 305 comprises receiving, by a processor, user data, the user data containing information related to at least one of a vehicle and a car wash preference. This step may be performed in accordance with processes performed by apparatus 100 as outlined in FIG. 1.

Continuing to refer to FIG. 3, step 310 comprises receiving, by the processor, sensor data related to the vehicle. This step may be performed in accordance with processes performed by apparatus 100 as outlined in FIG. 1.

Continuing to refer to FIG. 3, step 315 comprises adjusting, by the processor, an operational parameter of a car wash component based on the user data and the sensor data. This step may be performed in accordance with processes performed by apparatus 100 as outlined in FIG. 1.

Continuing to refer to FIG. 3, step 320 comprises altering, by the processor, an operational state of the car wash component based on the user data, the sensor data, and the adjustment to the operational parameter. This step may be performed in accordance with processes performed by apparatus 100 as outlined in FIG. 1.

Figure 4:
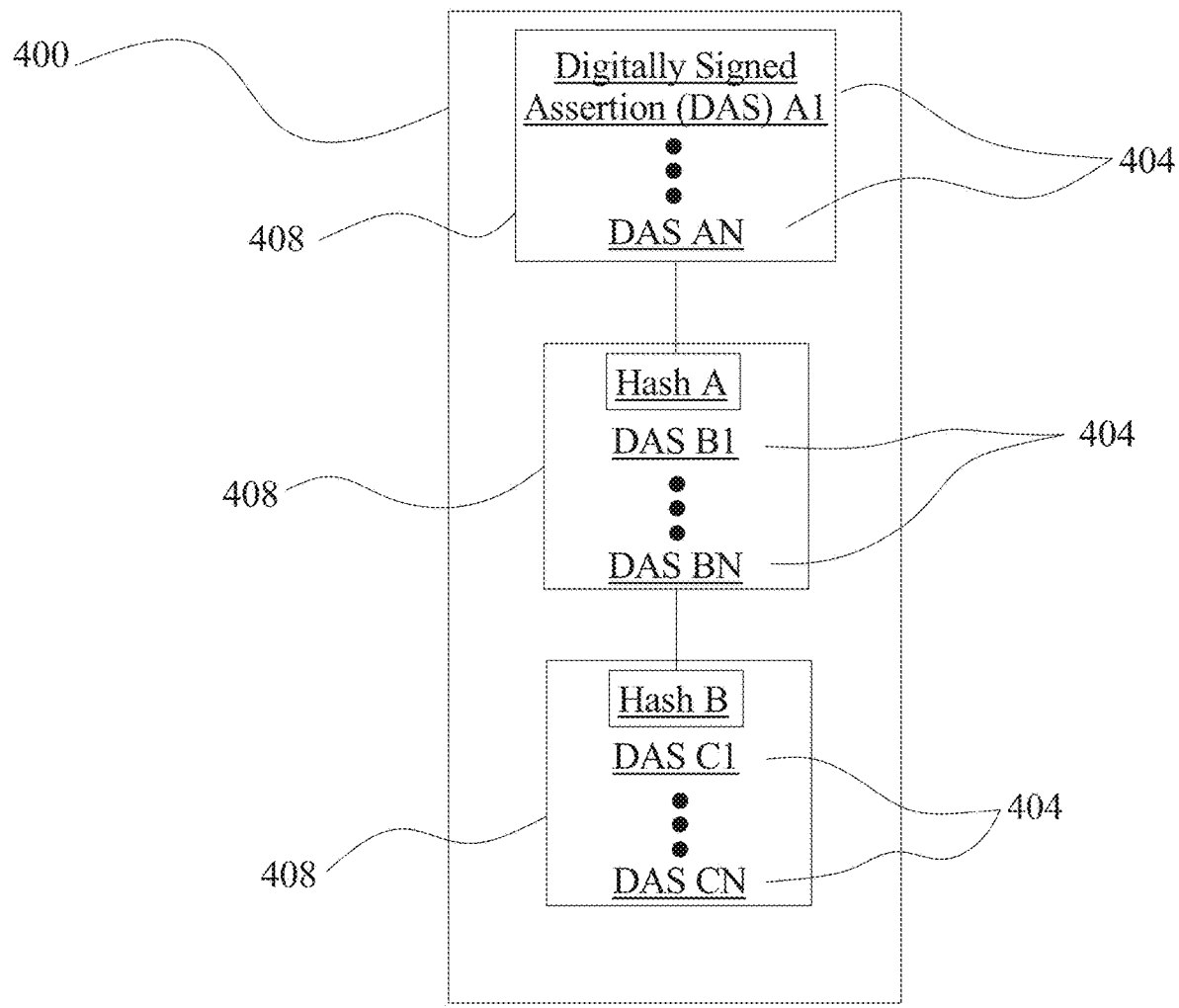
FIG. 4 is a diagram of an immutable sequential listing.

Referring now to FIG. 4, an exemplary embodiment of an immutable sequential listing 400 is illustrated. Data elements are listing in immutable sequential listing 400; data elements may include any form of data, including textual data, image data, encrypted data, cryptographically hashed data, and the like Data elements may include, without limitation, one or more at least a digitally signed assertions. In one embodiment, a digitally signed assertion 404 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or bash tree, or a hash of any other information desired to be recorded in some fashion using a digitally signed assertion 404. In an embodiment, collection of textual data states that the owner of a certain transferable item represented in a digitally signed assertion 404 register is transferring that item to the owner of an address. A digitally signed assertion 404 may be signed by a digital signature created using the private key associated with the owner's public key, as described above.

Continuing to refer to FIG. 4, a digitally signed assertion 404 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 404 may describe the transfer of a physical good; for instance, a digitally signed assertion 404 may describe the sale of a product. In some embodiments, a transfer nominally of one item may be used to represent a transfer of another item; for instance, a transfer of virtual currency may be interpreted as representing a transfer of an access right, conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 404 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Continuing to refer to FIG. 4, in one embodiment, an address is a textual datum identifying the recipient of virtual currency or another item of value in a digitally signed assertion 404. In some embodiments, address is linked to a public key, the corresponding private key of which is owned by the recipient of a digitally signed assertion 404. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 404 may record a subsequent a digitally signed assertion 404 transferring some or all of the value transferred in the first a digitally signed assertion 404 to a new address in the same manner. A digitally signed assertion 404 may contain textual information that is not a transfer of some item of value in addition to, or as an alternative to, such a transfer. For instance, as described in further detail below, a digitally signed assertion 404 may indicate a confidence level associated with a distributed storage node as described in further detail below.

Continuing to refer to FIG. 4, immutable sequential listing 400 may record a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 400 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Continuing to refer to FIG. 4, immutable sequential listing 400 may preserve the order in which the at least a posted content took place by listing them in chronological order; alternatively or additionally, immutable sequential listing 400 may organize digitally signed assertions 404 into sub-listings 408 such as "blocks" in a blockchain, which may be themselves collected in a temporally sequential order; digitally signed assertions 404 within a sub-listing 408 may or may not be temporally sequential. The ledger may preserve the order in which at least a posted content took place by listing them in sub-listings 408 and placing the sub-listings 408 in chronological order. The immutable sequential listing 400 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 400 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 4161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

Continuing to refer to FIG. 4, immutable sequential listing 400, once formed, may be inalterable by any party, no matter what access rights that party possesses. For instance, immutable sequential listing 400 may include a hash chain, in which data is added during a successive hashing process to ensure non-repudiation. Immutable sequential listing 400 may include a block chain. In one embodiment, a block chain is immutable sequential listing 400 that records one or more new at least a posted content in a data item known as a sub-listing 408 or "block." An example of a block chain is the BITCOIN block chain used to record BITCOIN transactions and values. Sub-listings 408 may be created in a way that places the sub-listings 408 in chronological order and link each sub-listing 408 to a previous sub-listing 408 in the chronological order so that any computing device may traverse the sub-listings 408 in reverse chronological order to verify any at least a posted content listed in the block chain. Each new sub-listing 408 may be required to contain a cryptographic hash describing the previous sub-listing 408. In some embodiments, the block chain contains a single first sub-listing 408 sometimes known as a "genesis block."

Continuing to refer to FIG. 4, the creation of a new sub-listing 408 may be computationally expensive; for instance, the creation of a new sub-listing 408 may be designed by a "proof of work" protocol accepted by all participants in forming the immutable sequential listing 400 to take a powerful set of computing devices a certain period of time to produce. Where one sub-listing 408 takes less time for a given set of computing devices to produce the sub-listing 408 protocol may adjust the algorithm to produce the next sub-listing 408 so that it will require more steps; where one sub-listing 408 takes more time for a given set of computing devices to produce the sub-listing 408 protocol may adjust the algorithm to produce the next sub-listing 408 so that it will require fewer steps. As an example, protocol may require a new sub-listing 408 to contain a cryptographic hash describing its contents; the cryptographic hash may be required to satisfy a mathematical condition, achieved by having the sub-listing 408 contain a number, called a nonce, whose value is determined after the fact by the discovery of the hash that satisfies the mathematical condition. Continuing the example, the protocol may be able to adjust the mathematical condition so that the discovery of the hash describing a sub-listing 408 and satisfying the mathematical condition requires more or less steps, depending on the outcome of the previous bashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 408 according to the protocol is known as "mining." The creation of a new sub-listing 408 may be designed by a "proof of stake" protocol as will be apparent to those skilled in the art upon reviewing the entirety of this disclosure.

Continuing to refer to FIG. 4, in some embodiments, protocol also creates an incentive to mine new sub-listings 408. The incentive may be financial; for instance, successfully mining a new sub-listing 408 may result in the person or entity that mines the sub-listing 408 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 408 Each sub-listing 408 created in immutable sequential listing 400 may contain a record or at least a posted content describing one or more addresses that receive an incentive, such as virtual currency, as the result of successfully mining the sub-listing 408.

Continuing to refer to FIG. 4, where two entities simultaneously create new sub-listings 408, immutable sequential listing 400 may develop a fork; protocol may determine which of the two alternate branches in the fork is the valid new portion of the immutable sequential listing 400 by evaluating, after a certain amount of time has passed, which branch is longer. "Length" may be measured according to the number of sub-listings 408 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 408 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 400 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 400.

Continuing to refer to FIG. 4, additional data linked to at least a posted content may be incorporated in sub-listings 408 in the immutable sequential listing 400; for instance, data may be incorporated in one or more fields recognized by block chain protocols that permit a person or computer forming a at least a posted content to insert additional data in the immutable sequential listing 400. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

Continuing to refer to FIG. 4, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 408 in a block chain computationally challenging; the incentive for producing sub-listings 408 may include the grant of new crypto-currency to the miners. Quantities of crypto-currency may be exchanged using at least a posted content as described above.

Figure 5:
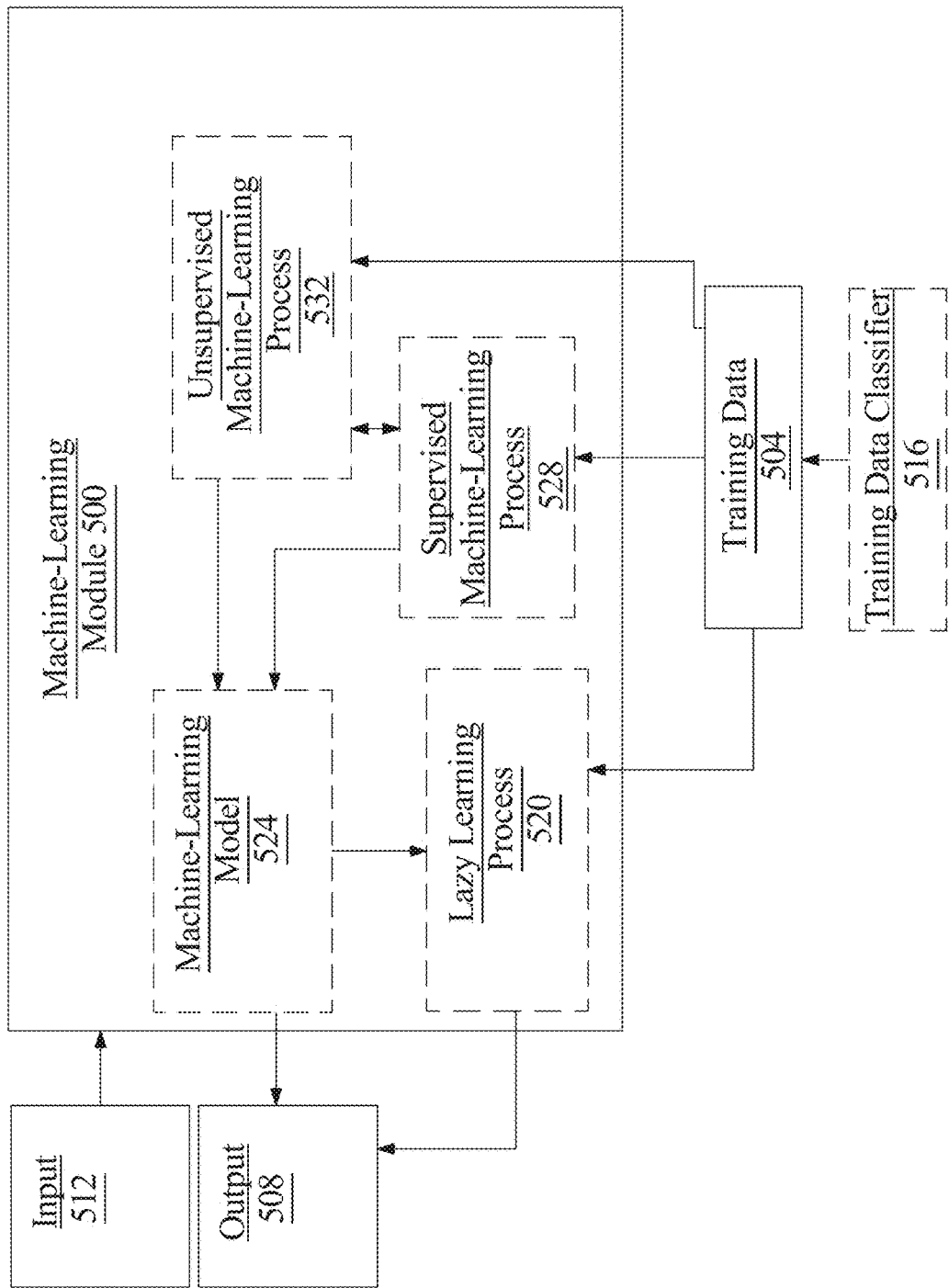
FIG. 5 is a block diagram of a machine learning module according to an embodiment of the invention.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, training data 504 may be in accordance with training data with reference to FIG. 1.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 6:
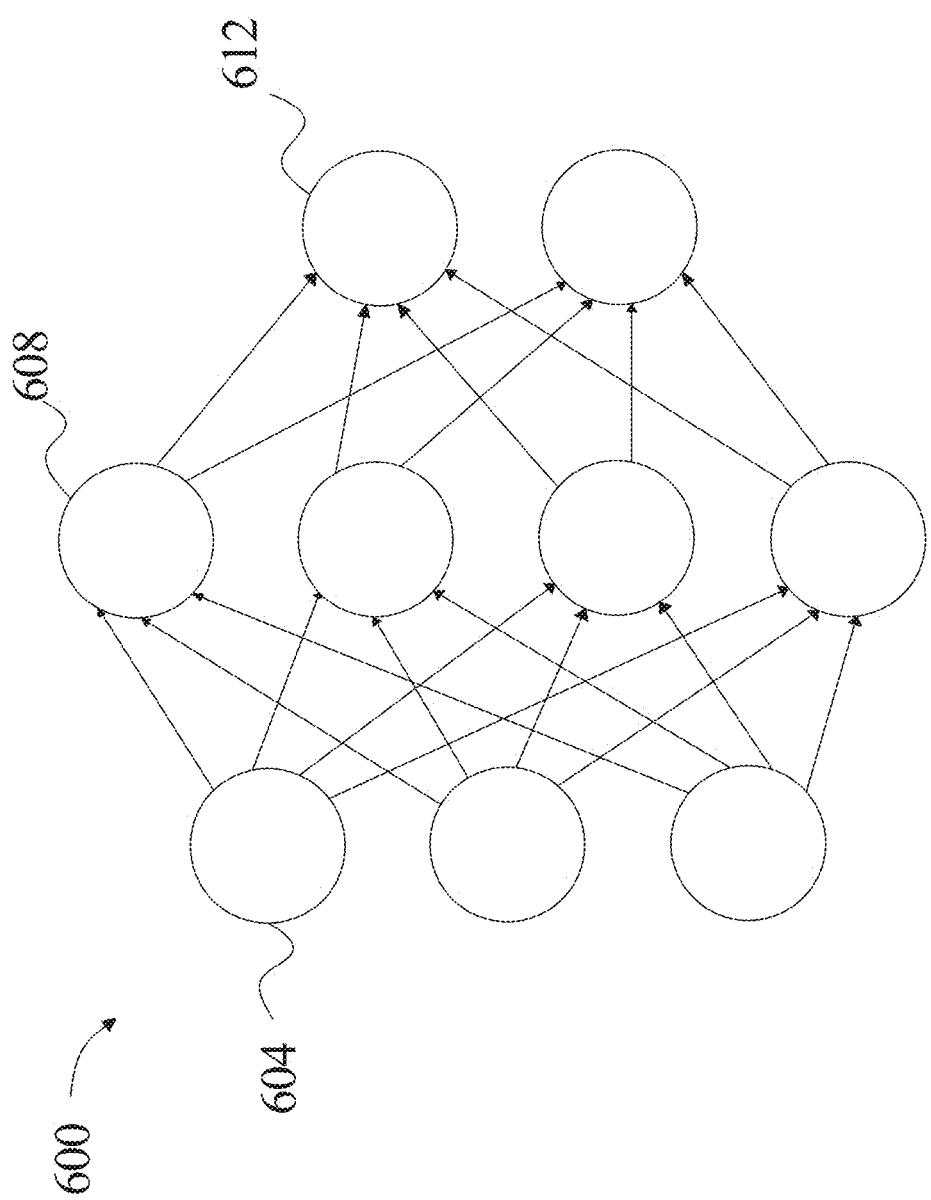
FIG. 6 is a diagram illustrating a neural network.

Referring now to FIG. 6, an exemplary embodiment of neural network 600 is illustrated A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
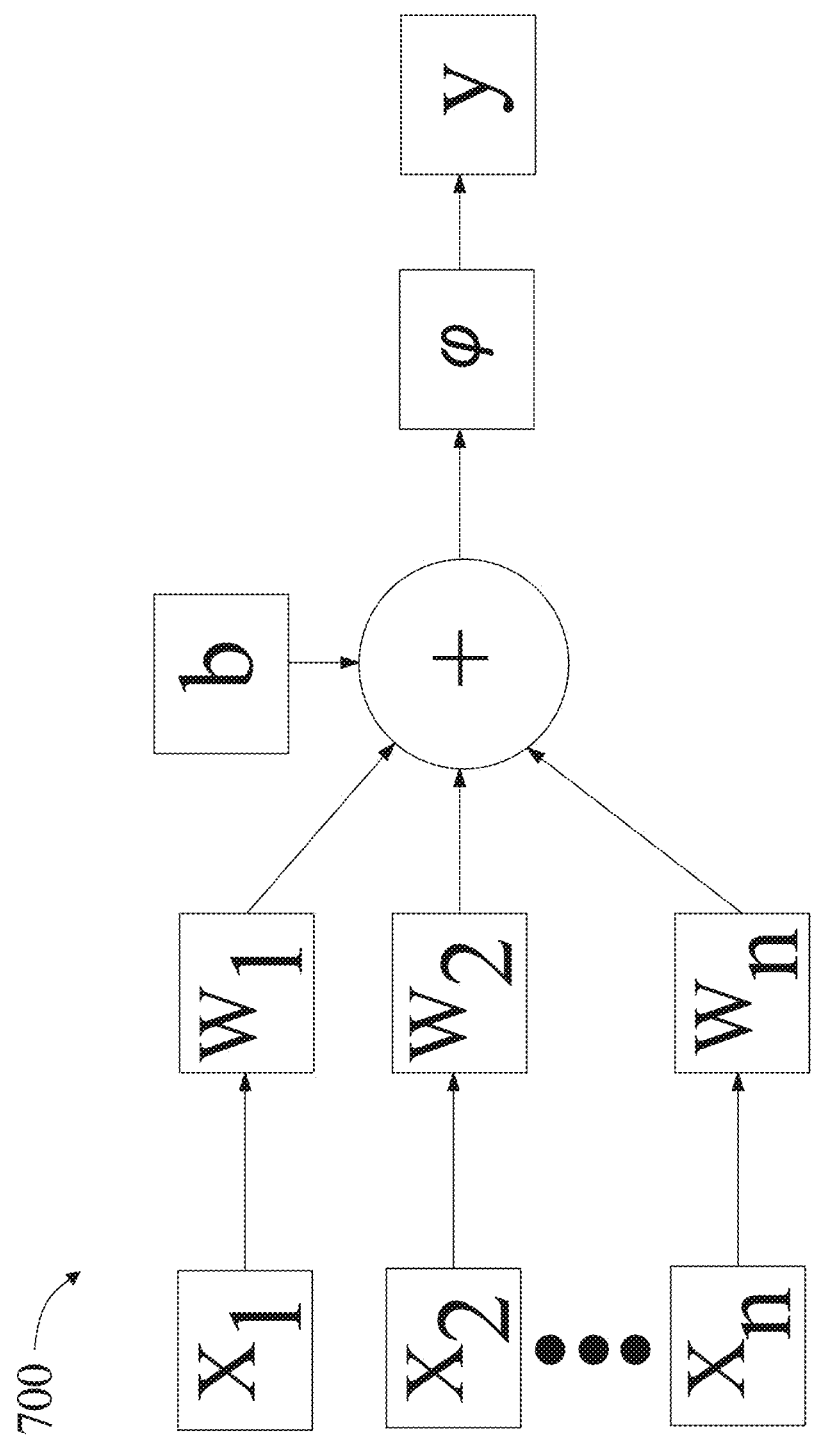
FIG. 7 is a diagram illustrating a node of a neural network.

Referring now to FIG. 7, an exemplary embodiment of a node 700 of a neural network is illustrated. A node may include, without limitation a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some $\alpha$, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. As used herein, "module" may refer to a hardware module or a software module. A hardware module is any collection of hardware configured to perform at least a specified task. A software module, conversely, is any collection of software instructions configured to perform at least a specified task.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs, one or more hard disk drives in combination with a computer memory, a distributed storage system such as cloud storage, and the like. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
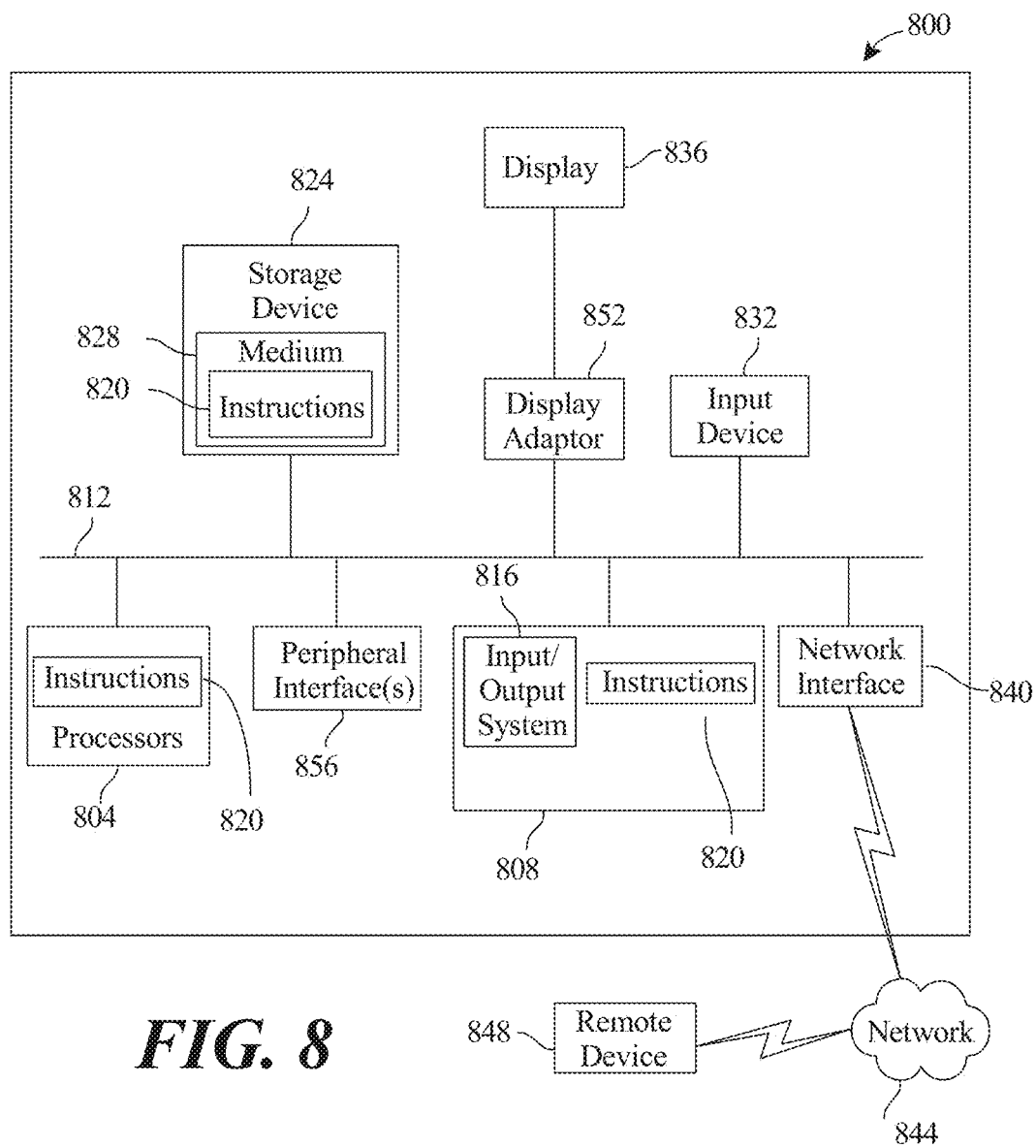
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

If not sufficiently clear from contextual or plain and ordinary usage, the terms "about," "around," "approximately," and "substantially," when used to modify a value, number, figure, quantity, or other term, can be understood to mean±20% of the modified value, inclusive. For instance, if not sufficiently clear from contextual or plain and ordinary usage, "about 10" can be understood to mean "from 8 to 12 inclusive". If not sufficiently clear from contextual or plain and ordinary usage, the term "relatively" should be construed to indicate that one of ordinary skill in the art would more closely associate the described value or modifier with the term it modifies (such as high) than another term in a similar class of words (such as low or medium). For instance, if a temperature is described as being "relatively high," one of ordinary skill in the art would more closely associate said temperature with "high" temperatures than "medium" or "low" temperatures. In another example, if a tire pressure between 30-33 psi is considered "standard," then the term "relatively low pressure" would indicate that the stated pressure would be more readily identified by one of ordinary skill in the art as being "low" than being "standard;" for instance, 26 psi.

As used herein, "and/or" is meant to include all possible permutations of "and" and "or". "And/or" may indicate every element of a specified grouping, combinations of less than all elements, or one element. For example, "A, B, and/or C" can mean any single one of A, B, or C; A and B but not C, B and C but not A, A and C but not B; and A, B, and C together.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for car wash customization, the apparatus comprising:
   at least a sensor;
   a processor; and
   a memory communicatively coupled to the processor, the memory containing instructions configuring the processor to:
   receive user data, the user data containing information related to at least one of a vehicle and a car wash preference, wherein receiving the car wash preference comprises:
   generating, using the processor, an image of the vehicle as detected by the at least a sensor;
   displaying, using a user interface, the image of the vehicle;
   generating, using the processor, a text prompt;
   receiving, using the user interface, a response to the text prompt, wherein the response comprises a user-drawn movement pattern that indicates a successive sequence of positions for a cleaning device to occupy successively over a predetermined period of time;

determining, using the processor, the car wash preference as a function of the response to the text prompt;
receive sensor data related to the vehicle;
compare the sensor data with a calibration measurement;
calibrate a location of the at least a sensor as a function of the comparison of the sensor data and the calibration measurement, wherein calibrating the location of the at least a sensor comprises:
assigning at least a spatial coordinate to the location of the at least a sensor; and
determining a location of the vehicle by determining a distance and angle from the location of the at least a sensor to the location of the vehicle;
detect a vehicle contamination of the vehicle as a function of the sensor data related to the vehicle, the vehicle contamination comprising a shape and an extent of the vehicle contamination, wherein the processor compares a determined vehicle color with the sensor data related to the vehicle, wherein the processor selects elements with values differing from the determined vehicle color as the vehicle contamination;
adjust a car wash component based on the user data, the sensor data, and the vehicle contamination; and
alter an operational state of the car wash component based on the user data, the sensor data, and the adjustment to an operational parameter.

2. The apparatus of claim 1, wherein:
the car wash component comprises a first car wash component and a second car wash component; and
the processor is further configured to alter an operational state of the second car wash component based on an operational parameter of the first car wash component.

3. The apparatus of claim 2, wherein the first car wash component comprises the cleaning device and the second car wash component comprises a light-emitting device.

4. The apparatus of claim 3, wherein:
the cleaning device is at least one of a brush, a sprayer, and a chemical tire applicator; and
the light-emitting device is at least one of a display, a light, an LED, and a projector.

5. The apparatus of claim 1, wherein the user data comprises membership information for a user.

6. The apparatus of claim 5, wherein the membership information comprises a membership tier for the user.

7. The apparatus of claim 6, where the processor is further configured to generate a unique token as a function of the membership tier.

8. The apparatus of claim 1, wherein the processor is further configured to personalize the user interface based on generating a unique token as a function of at least one car wash service selected by a user.

9. The apparatus of claim 1, wherein the user data comprises a command altering the operational state of the car wash component.

10. The apparatus of claim 9, wherein the command comprises a movement pattern for a cleaning device.

11. A method for car wash customization via an apparatus for car wash customization comprising at least a sensor, a processor, and a memory communicatively coupled to the processor, the memory containing instructions to perform the method, the method comprising:
receiving, by the processor, user data, the user data containing information related to at least one of a vehicle and a car wash preference, wherein receiving the car wash preference comprises:
generating, using the processor, an image of the vehicle as detected by the at least a sensor;
displaying, using a user interface, the image of the vehicle;
generating, using the processor, a text prompt;
receiving, using the user interface, a response to the text prompt, wherein the response comprises a user-drawn movement pattern that indicates a successive sequence of positions for a cleaning device to occupy successively over a predetermined period of time;
determining, using the processor, the car wash preference as a function of the response to the text prompt;
receiving, by the processor, sensor data related to the vehicle;
compare the sensor data with a calibration measurement;
calibrate a location of the at least a sensor as a function of the comparison of the sensor data and the calibration measurement, wherein calibrating the location of the at least a sensor comprises:
assigning at least a spatial coordinate to the location of the at least a sensor; and
determining a location of the vehicle by determining a distance and angle from the location of the at least a sensor to the location of the vehicle;
detect a vehicle contamination of the vehicle as a function of the sensor data related to the vehicle, the vehicle contamination comprising a shape and an extent of the vehicle contamination, wherein the processor compares a determined vehicle color with the sensor data related to the vehicle, wherein the processor selects elements with values differing from the determined vehicle color as the vehicle contamination;
adjusting, by the processor, a car wash component based on the user data, the sensor data, and the vehicle contamination; and
altering, by the processor, an operational state of the car wash component based on the user data, the sensor data, and the adjustment to an operational parameter.

12. The method of claim 11, wherein:
the car wash component comprises a first car wash component and a second car wash component; and
the method further comprises altering, by the processor, an operational state of the second car wash component based on an operational parameter of the first car wash component.

13. The method of claim 12, wherein the first car wash component comprises the cleaning device and the second car wash component comprises a light-emitting device.

14. The method of claim 13, wherein:
the cleaning device is at least one of a brush, a sprayer, and a chemical tire applicator; and
the light-emitting device is at least one of a display, a light, an LED, and a projector.

15. The method of claim 11, wherein the user data comprises membership information for a user.

16. The method of claim 15, wherein the membership information comprises a membership tier for the user.

17. The method of claim 16, further comprising generating, by the processor, a unique token as a function of the membership tier.

18. The method of claim 11, further comprising personalizing, by the processor, the user interface based on generating a unique token as a function of at least one car wash service selected by a user.

19. The method of claim 11, wherein the user data comprises a relation between a vehicle and a user.

20. The method of claim 19, wherein the user data comprises a historical record of the car wash preference.

* * * * *